(12) United States Patent
Yamakawa et al.

(10) Patent No.: US 9,512,814 B2
(45) Date of Patent: Dec. 6, 2016

(54) CONTROL METHOD OF SPARK IGNITION ENGINE AND SPARK IGNITION ENGINE

(75) Inventors: Masahisa Yamakawa, Hiroshima (JP); Takashi Youso, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 992 days.

(21) Appl. No.: 13/643,254

(22) PCT Filed: Apr. 27, 2011

(86) PCT No.: PCT/JP2011/002481
§ 371 (c)(1),
(2), (4) Date: Oct. 24, 2012

(87) PCT Pub. No.: WO2011/135859
PCT Pub. Date: Nov. 3, 2011

(65) Prior Publication Data
US 2013/0047958 A1 Feb. 28, 2013

(30) Foreign Application Priority Data

Apr. 30, 2010 (JP) ................. 2010-104847

(51) Int. Cl.
*F02D 41/06* (2006.01)
*F02P 5/14* (2006.01)
(Continued)

(52) U.S. Cl.
CPC ......... *F02P 5/1502* (2013.01); *F02D 13/0219* (2013.01); *F02D 13/0246* (2013.01);
(Continued)

(58) Field of Classification Search
CPC ..... Y02T 10/18; Y02T 10/26; Y02T 10/128; F02D 41/006; F02D 41/024; F02D 41/0255; F02D 41/064; F02D 41/068; F02D 41/3017; F02D 41/3023; F02D 41/3029; F02D 41/3035; F02D 41/3041; F02D 41/3047; F02D 41/3052; F02D 2041/001; F02D 13/0261; F02D 13/0265; F02D 2013/0292; F02D 2200/0802; F02M 25/0752; F02M 26/01
USPC ........... 123/90.15, 295, 305, 406.44, 406.55, 123/568.14; 60/284, 285; 701/102, 103, 701/104, 108, 113
See application file for complete search history.

(56) References Cited

U.S. PATENT DOCUMENTS 5,293,741 A * 3/1994 Kashiyama ........... F01N 3/2006
123/585
5,398,502 A * 3/1995 Watanabe ........... F01L 13/0015
123/90.15
(Continued)

FOREIGN PATENT DOCUMENTS

CN 1189577 A 8/1998
CN 1274407 A 11/2000
(Continued)

OTHER PUBLICATIONS

The first Office Action issued by the Chinese Patent Office on Sep. 18, 2014, which corresponds to Chinese Patent Application No. 201180021875.4 and is related to U.S. Appl. No. 13/643,254; with English language summary.
(Continued)

*Primary Examiner* — Mahmoud Gimie
*Assistant Examiner* — John Zaleskas
(74) *Attorney, Agent, or Firm* — Studebaker & Brackett PC

(57) ABSTRACT

A control method of a spark ignition engine and a spark ignition engine capable of warming up an engine more promptly while promptly activating a catalyst are provided. Implemented is the control of igniting a mixture at an ignition timing that is set on a more lag side than an MBT, which is an ignition timing in which an output torque of the engine becomes maximum until the catalyst is activated after the engine is started. After the catalyst is activated, until the engine is warmed up control of increasing a ratio of burned gas contained in the mixture within the combustion chamber to be more than the ratio of the burned gas in the mixture during a first period, and control of igniting the mixture containing more burned gas than the burned gas in the first period are implemented.

15 Claims, 5 Drawing Sheets

(51) Int. Cl.
*F02P 5/15* (2006.01)
*F02D 13/02* (2006.01)
*F02D 41/00* (2006.01)
*F02D 41/02* (2006.01)
*F02D 41/30* (2006.01)
*F02B 1/12* (2006.01)
*F02B 23/10* (2006.01)
*F02B 75/12* (2006.01)

(52) U.S. Cl.
CPC ......... *F02D13/0273* (2013.01); *F02D 41/006* (2013.01); *F02D 41/0255* (2013.01); *F02D 41/068* (2013.01); *F02D 41/3041* (2013.01); *F02M 26/01* (2016.02); *F02B 1/12* (2013.01); *F02B 23/104* (2013.01); *F02B 2075/125* (2013.01); *F02D 2200/0804* (2013.01); *F02P 5/1506* (2013.01); *Y02T 10/123* (2013.01); *Y02T 10/128* (2013.01); *Y02T 10/18* (2013.01); *Y02T 10/26* (2013.01); *Y02T 10/46* (2013.01); *Y02T 10/47* (2013.01)

(56) References Cited

U.S. PATENT DOCUMENTS

| | | | | |
|---|---|---|---|---|
| 5,738,074 A * | 4/1998 | Nakamura | ............ | F02D 35/023 123/305 |
| 5,778,857 A * | 7/1998 | Nakamura | ............ | F02D 35/023 123/406.29 |
| 6,044,642 A * | 4/2000 | Nishimura | ............ | F02D 41/024 123/295 |
| 6,253,866 B1 * | 7/2001 | Kojima | .................. | B60K 6/445 180/165 |
| 6,266,957 B1 * | 7/2001 | Nozawa | .................... | F01L 1/34 60/284 |
| 6,345,499 B1 | 2/2002 | Nishimura et al. | | |
| 6,484,676 B2 * | 11/2002 | Shimizu | .................... | F01L 1/34 123/90.15 |
| 6,637,386 B2 * | 10/2003 | Murata | .................... | F01L 1/34 123/90.15 |
| 6,684,630 B2 * | 2/2004 | Uchida | .................. | F02D 37/02 60/280 |
| 6,691,506 B2 * | 2/2004 | Shimizu | .................... | F01L 1/34 123/90.15 |
| 6,978,771 B2 * | 12/2005 | Kuzuyama | .......... | F02D 13/0215 123/294 |
| 6,983,730 B2 * | 1/2006 | Kuzuyama | .......... | F02D 13/0203 123/294 |
| 7,021,277 B2 * | 4/2006 | Kuo | .................... | F02D 13/0215 123/295 |
| 7,117,666 B2 * | 10/2006 | Tomita | .................. | F02D 41/024 60/282 |
| 7,155,899 B2 * | 1/2007 | Beer | .................... | F01N 3/006 123/90.15 |
| 7,290,524 B2 * | 11/2007 | Kobayashi | .......... | F02D 13/0246 123/315 |
| 7,725,237 B2 * | 5/2010 | Yasui | .................... | F02D 35/023 701/101 |
| 8,096,108 B2 * | 1/2012 | Najt | ...................... | F01N 3/2006 60/274 |
| 8,185,218 B2 * | 5/2012 | Yasui | .................... | F02D 35/023 123/295 |
| 2002/0189238 A1 * | 12/2002 | Nakagawa | ............ | F01N 3/006 60/284 |
| 2003/0056750 A1 * | 3/2003 | Fuerhapter | .............. | F01L 1/143 123/295 |
| 2003/0070637 A1 * | 4/2003 | Majima | ..................... | F01L 9/04 123/90.15 |
| 2003/0182931 A1 * | 10/2003 | Sonoda | ..................... | F01L 1/34 60/284 |
| 2005/0081511 A1 * | 4/2005 | Tomita | .................. | F02D 41/024 60/274 |
| 2005/0224045 A1 * | 10/2005 | Kuzuyama | .......... | F02D 13/0203 123/305 |
| 2005/0235952 A1 * | 10/2005 | Kuzuyama | .......... | F02D 13/0215 123/305 |
| 2007/0074702 A1 * | 4/2007 | Nakamura | .............. | F01N 3/035 123/299 |
| 2007/0215095 A1 * | 9/2007 | Kakuya | .................... | F02D 37/02 123/295 |
| 2007/0227517 A1 * | 10/2007 | Casal Kulzer | ...... | F02D 13/0276 123/568.14 |
| 2008/0270004 A1 * | 10/2008 | Kuo | .................... | F02D 13/0203 701/103 |
| 2008/0271436 A1 * | 11/2008 | Najt | ...................... | F01N 3/2006 60/285 |
| 2009/0063021 A1 * | 3/2009 | Natsui | .................. | F02D 13/0234 701/105 |
| 2009/0070007 A1 * | 3/2009 | Natsui | .................. | F02B 23/101 701/103 |
| 2009/0229566 A1 * | 9/2009 | Sauer | .................. | F02D 13/0265 123/295 |
| 2010/0057325 A1 | 3/2010 | Livshiz et al. | | |
| 2010/0242899 A1 * | 9/2010 | Hitomi | ................ | F02D 41/3035 123/299 |
| 2010/0242900 A1 * | 9/2010 | Hitomi | .................. | F02D 35/023 123/299 |
| 2010/0269771 A1 * | 10/2010 | Wermuth | ............ | F02D 13/0211 123/90.16 |

FOREIGN PATENT DOCUMENTS

| | | |
|---|---|---|
| JP | 2005-163743 A | 6/2005 |
| JP | 2007-040310 A | 2/2007 |
| JP | 2008-002435 A | 1/2008 |
| JP | 4182770 B2 | 11/2008 |

OTHER PUBLICATIONS

International Search Report; PCT/JP2011/002481; Apr. 30, 2011.

* cited by examiner

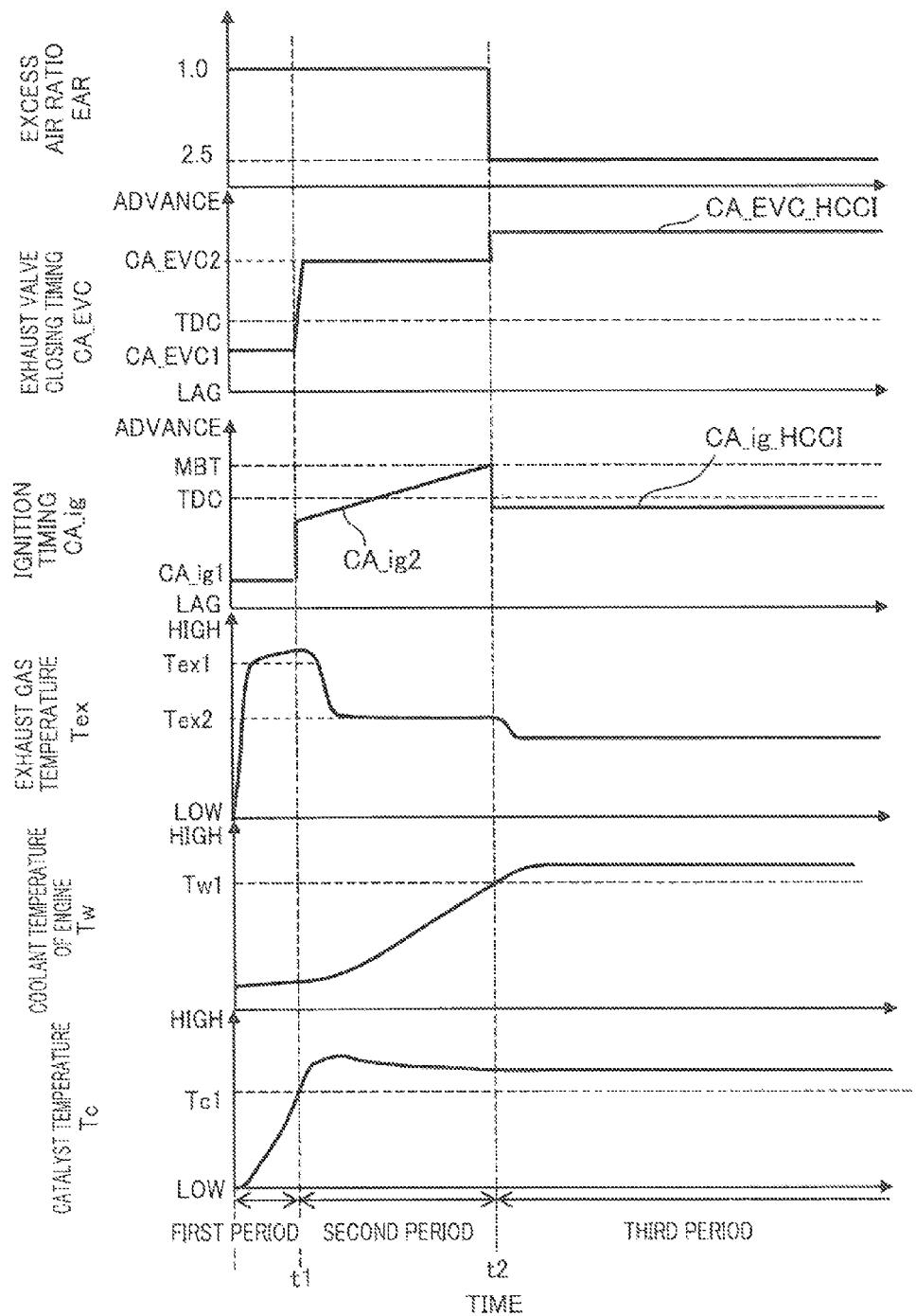

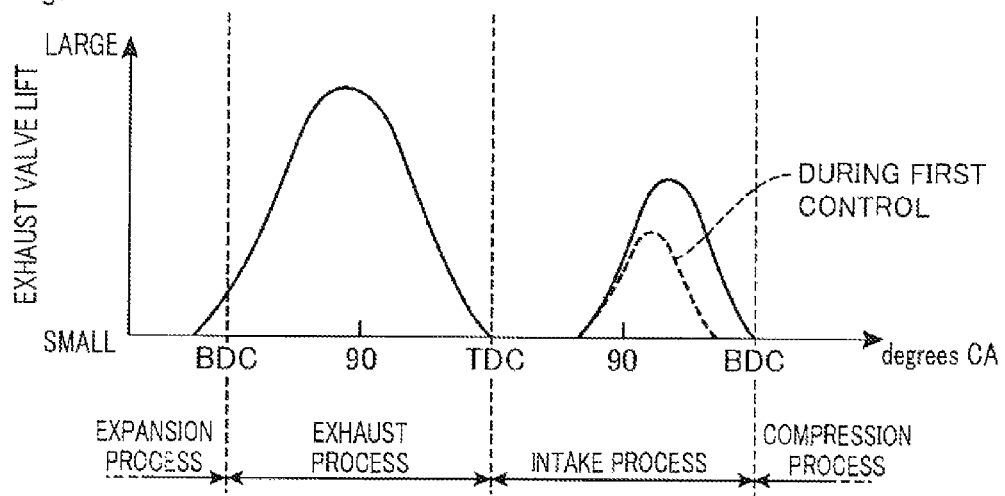

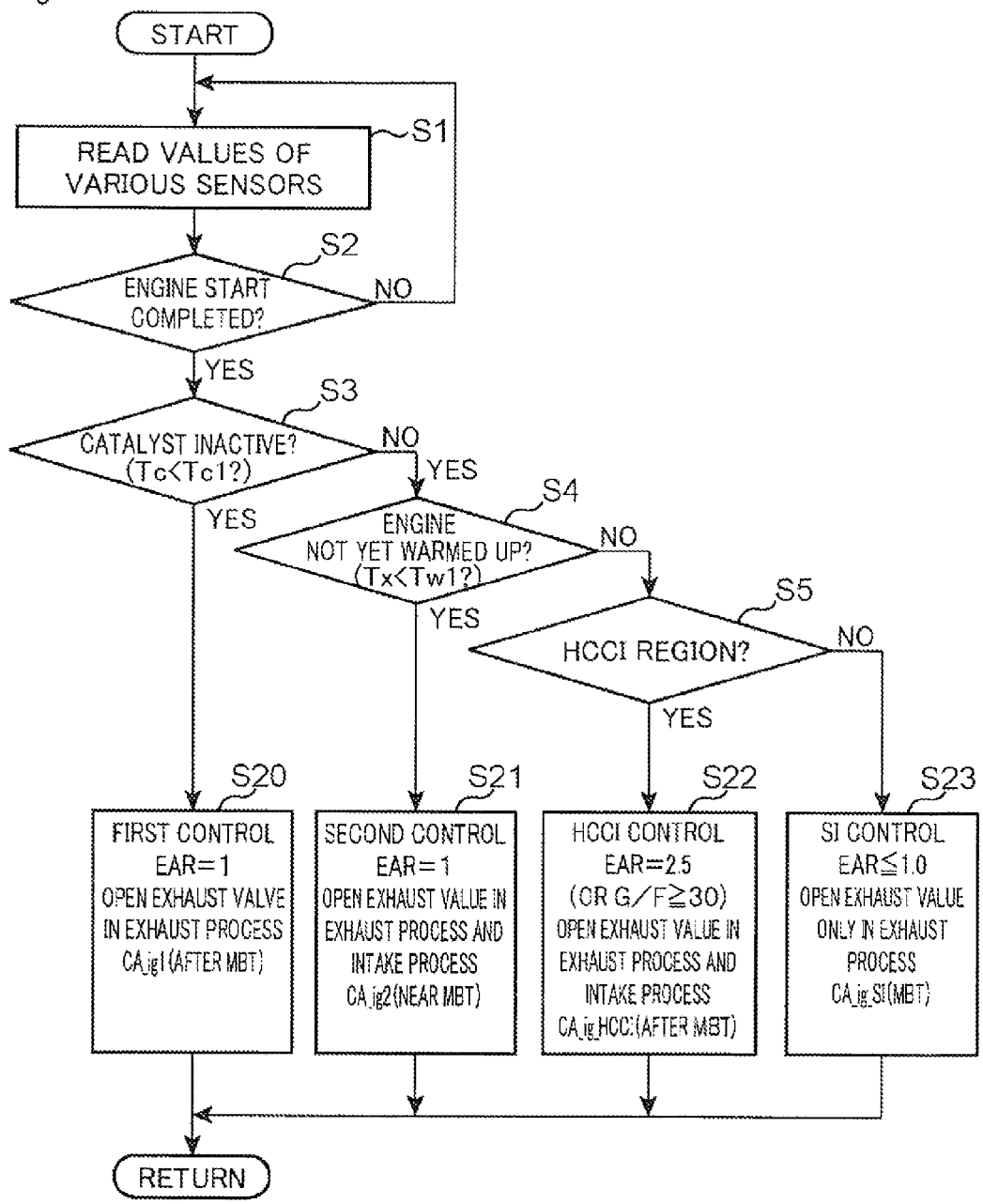

CONTROL METHOD OF SPARK IGNITION ENGINE AND SPARK IGNITION ENGINE

TECHNICAL FIELD

The present invention relates to a method of controlling a spark ignition engine having a spark plug capable of igniting a mixture within a combustion chamber formed in a cylinder, and a catalyst capable of purifying exhaust gas, as well as to such a spark ignition engine.

BACKGROUND ART

Conventionally, technologies for promptly activating a catalyst have been developed for vehicles and the like comprising an engine in order to inhibit the discharge of harmful substances, which are generated during combustion in an engine, into the atmosphere, and for reliably inhibiting the discharge amount of such harmful substances by including a catalyst provided in an exhaust passage and capable of purifying the exhaust gas from the engine.

For example, Patent Document 1 discloses a system comprising a diesel engine and a catalyst, wherein the thermal energy of the exhaust gas flowing to the catalyst is caused to be higher than during normal operation after the diesel engine is started. With this system, the temperature of the catalyst rises to the activation temperature more promptly.

With an engine provided to a vehicle or the like, it is desirable for the engine to warm up promptly in order to promptly activate the catalyst, and in order to improve the combustion stability which will consequently lead to the improvement in the fuel consumption performance and the improvement in the exhaust gas performance. Meanwhile, with the foregoing conventional system, most of the combustion energy that is generated with the engine after the engine is started is emitted to the exhaust side as exhaust energy. Thus, the energy for warming up the engine itself becomes small, and, consequently, there is a problem in that the engine cannot be warmed up promptly.

CITATION LIST

Patent Literature

[PTL 1]
Japanese Patent No. 4182770

SUMMARY OF INVENTION

In order to solve the foregoing problem, the control method of a spark ignition engine according to the present invention is a method of controlling a spark ignition engine having a spark plug capable of igniting a mixture within a combustion chamber formed in a cylinder, a catalyst provided at an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio, and catalyst temperature detection device for detecting or estimating a temperature of the catalyst, with the spark ignition engine being configured to be capable of igniting the mixture in a combustion chamber and changing a opening/closing timing of at least an exhaust valve of the engine, wherein the control method includes: a first step of igniting the mixture at an ignition timing that is set to be on a more lag side than an MBT (minimum advance for the best torque), which is an ignition timing in which an output torque of the engine becomes maximum, during a period from the time at which the start of the engine is completed and the engine starts autonomous rotation to the time at which a temperature of the catalyst detected or estimated by the catalyst temperature detection device becomes higher than a predetermined temperature; a second step of changing the valve opening timing and/or valve closing timing of the exhaust valve so that a ratio of burned gas contained in the mixture within the combustion chamber becomes higher than the ratio of the burned gas during the implementation of the first step from the time at which the temperature of the catalyst detected or estimated by the catalyst temperature detection device becomes higher than a predetermined temperature; and a third step of igniting the mixture within the combustion chamber from the time at which the temperature of the catalyst detected or estimated by the catalyst temperature detection device becomes higher than a predetermined temperature.

According to the foregoing method, it is possible to promptly activate the catalyst as well as promptly warm up the engine.

BRIEF DESCRIPTION OF DRAWINGS

FIG. 4 is a timing chart showing the results upon controlling the engine using the control method of the spark ignition engine according to the first embodiment of the present invention.

FIG. 5 is a diagram explaining the valve opening operation of the exhaust valve in the spark ignition engine according to the second embodiment of the present invention.

FIG. 6 is a flowchart showing the control method of the spark ignition engine according to the second embodiment of the present invention.

DESCRIPTION OF EMBODIMENTS

The first embodiment of the spark ignition engine according to the present invention is now explained with reference to FIG. 1 to FIG. 4.

Figure 1:
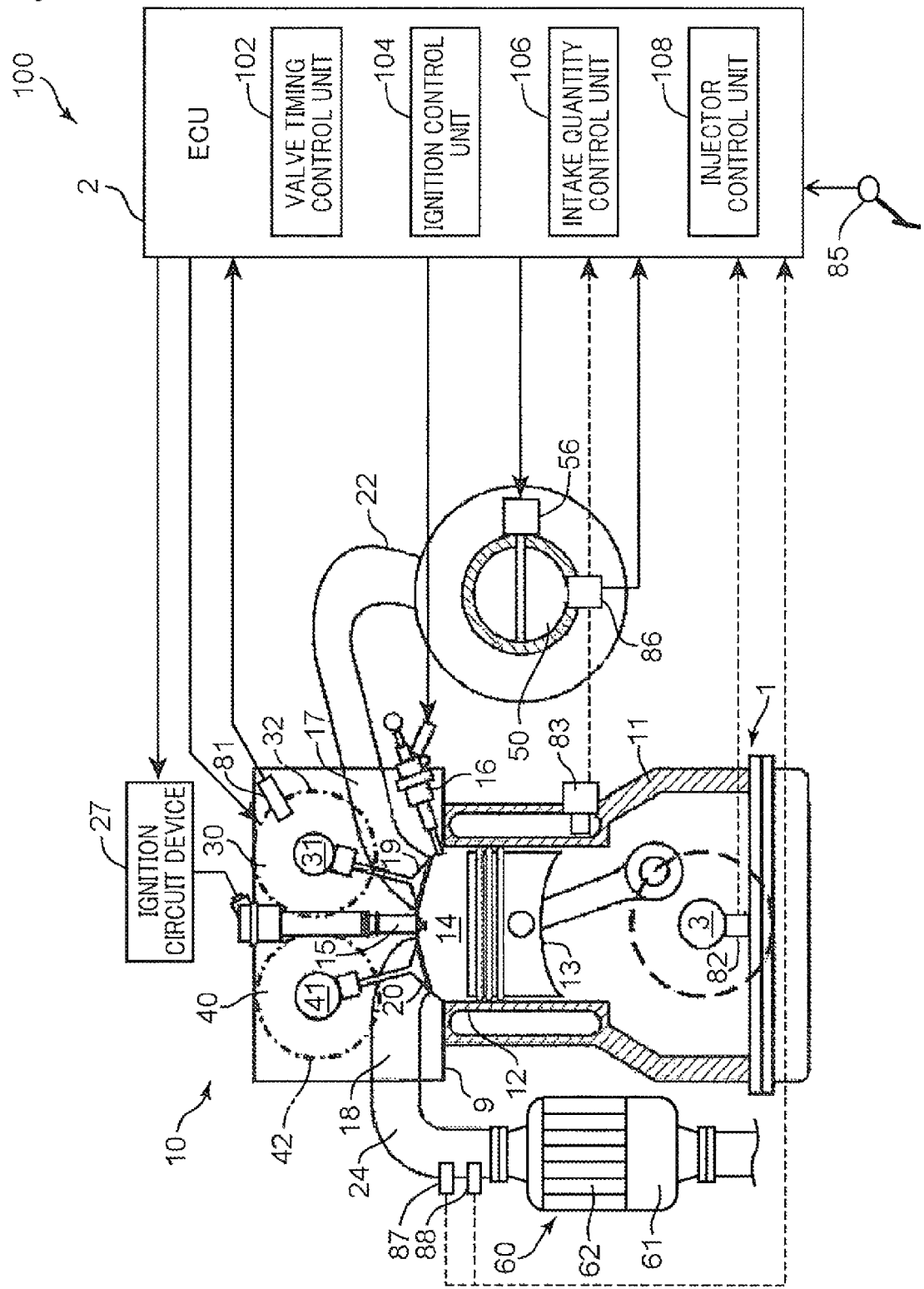
FIG. 1 is a diagram showing the overall configuration of the spark ignition engine according to an embodiment of the present invention.

FIG. 1 is a schematic configuration diagram of a spark ignition engine 100. The spark ignition engine 100 comprises an engine body 1 including a cylinder head 9 and a cylinder block 11, an ECU (control unit) 2 for controlling the engine control, and various accessories. The engine body 1 is a gasoline engine, and is driven by the combustion of fuel primarily composed of gasoline. Note that the foregoing fuel may entirely be gasoline, or a mixture in which ethanol (ethyl alcohol) or the like is added to gasoline.

A plurality of cylinders 12 are formed inside the cylinder block 11 and the cylinder head 9. A piston 13 is inserted through the respective cylinders 12. In this embodiment, four cylinders 12 are formed on the engine body 1. A combustion chamber 14 is formed between the top face of the respective pistons 13 and the cylinder head 9, respectively. The piston 13 is coupled to a crank shaft 3. In this embodiment, the geometric compression ratio of the engine body 1 is set to 15 or higher. This value of 15 or higher is high relative to the geometric compression ratio of a standard gasoline engine which is 9 to 11.

The engine body 1 is provided with a crank angle sensor 82 for detecting the angle of rotation of the crank shaft 3. The ECU 2 calculates the engine revolution NE based on the detection signal that is output from the crank angle sensor 82. The engine body 1 is provided with a engine coolant temperature sensor (engine coolant temperature detection device) 83 for detecting the temperature of the engine coolant. The engine coolant flows through a water jacket formed in the cylinder head 9 and the cylinder block 11.

A spark plug 15 is disposed at the apex of the combustion chamber 14 of the respective cylinders 12. The tip of the respective spark plugs 15 faces the inside of the respective combustion chambers 14. The respective spark plugs 15 are electrically connected to the ignition circuit device 27. The ignition circuit device 27 generates power for a spark discharge. The respective spark plugs 15 discharge a spark to a mixture within the combustion chamber 14 at a prescribed timing according to the power fed from the ignition circuit device 27.

An injector 16 is provided to the side of each of the combustion chambers 14, respectively. The respective injectors 16 directly inject fuel primarily composed of gasoline into the respective combustion chambers 14.

Two intake ports 17 and two exhaust ports 18 are respectively provided to the upper part of each of the cylinders 12. The respective ports 17, 18 are in communication with the combustion chamber 14. The air-intake passes through the intake ports 17 and flow into the combustion chamber 14. Gas inside the combustion chamber 14 passes through the exhaust ports 18 and is emitted outside of the combustion chamber 14. An intake valve 19 is provided to the joint of the respective intake ports 17 and the combustion chamber 14. The intake valve 19 opens/closes the intake ports 17 for communicating or blocking the intake ports 17 and the combustion chamber 14. An exhaust valve 20 is provided to the joint of the respective exhaust ports 18 and the combustion chamber 14. The exhaust valve 20 opens/closes the exhaust port 18 for communicating or blocking the exhaust ports 18 and the combustion chamber 14. The intake valve 19 opens/closes the intake ports 17 at a prescribed timing by being driven by an intake valve drive mechanism 30. Moreover, the exhaust valve 20 opens/closes the exhaust ports 18 at a prescribed timing by being driven by the exhaust valve drive mechanism 40.

The intake valve drive mechanism 30 includes an intake cam shaft 31 and an intake VVT 32 which are coupled to the intake valve 19. The intake cam shaft 31 is coupled to the crank shaft 3 via a power transmission mechanism such as a well-known chain/sprocket mechanism. The intake cam shaft 31 opens/closes the intake valve 19 by being rotated pursuant to the rotation of the crank shaft 3.

The intake VVT 32 changes the valve timing of the intake valve 19. The intake VVT 32 is disposed coaxially with the cam shaft 31. The intake VVT 32 changes the phase difference between a predetermined driven shaft that is directly driven by the crank shaft 3, and the intake cam shaft 31. Accordingly, the intake VVT 32 changes the valve timing of the intake valve 19 by changing the phase difference between the crank shaft 3 and the intake cam shaft 31. The intake VVT 32 is, for example, a hydraulic mechanism, an electromagnetic mechanism or the like. The hydraulic intake VVT includes a plurality of liquid chambers aligned circumferentially between the driven shaft and the intake cam shaft 31. The hydraulic intake VVT changes the phase difference by causing a pressure difference between the foregoing liquid chambers. The electromagnetic intake VVT includes an electromagnet provided between the driven shaft and the intake cam shaft 31. The electromagnetic intake VVT changes the phase difference by applying power to the electromagnet. The intake VVT 32 changes the phase difference based on the target valve timing of the intake valve 19 that was calculated by the ECU 2.

The exhaust valve drive mechanism 40 is structured the same as the intake valve drive mechanism 30. Specifically, the exhaust valve drive mechanism 40 includes an exhaust cam shaft 41 coupled to the exhaust valve 20 and the crank shaft 3, and an exhaust VVT (variable valve timing mechanism) 42. The exhaust VVT 42 changes the phase difference of the exhaust cam shaft 41 and the crank shaft 3, and changes the valve timing of the exhaust valve 20. The exhaust VVT 42 changes the phase difference based on the target valve timing of the exhaust valve 20 that was calculated by the ECU 2. The exhaust cam shaft 41 drives the opening/closing of the exhaust valve 20 at the target valve timing.

Note that, in this embodiment, the intake VVT 32 and the exhaust VVT 42 respectively change the opening timing (valve opening timing) and the closing timing (valve closing timing) of the intake valve 19 and the exhaust valve 20 while respectively maintaining the valve opening period and the lift of the intake valve 19 and the exhaust valve 20 to be constant. In other words, the valve profile of the intake valve 19 and the exhaust valve 20 is maintained to be constant.

The intake port 17 is connected to an intake pipe 22. A throttle valve 50 is provided to the intake pipe 22. The throttle valve 50 changes the opening area of the intake pipe 22, and changes the amount of air-intake that flows into the respective cylinders 12 by passing through the intake pipe 22 from the outside. The throttle valve 50 is driven by a throttle actuator 56. The throttle actuator 56 drives the throttle valve 50 so that the aperture of the throttle valve 50 becomes the target throttle aperture that was calculated by the ECU 2. The intake pipe 22 is provided with an intake quantity sensor 86 for detecting the air-intake amount.

The exhaust port 18 is connected to an exhaust pipe (exhaust passage) 24. The exhaust pipe 24 is provided with a catalytic device 60. The catalytic device 60 includes a casing 61, and a three way catalyst body (catalyst) 62 housed in the casing 61. The three way catalyst body 62 is capable of purifying the HC (hydrocarbon), CO (carbon monoxide) and NOx (nitrogen oxide) contained in the exhaust gas, and includes the so-called three way catalyst function. The three way catalyst body 62 detoxifies the HC, CO, and NOx contained in the exhaust gas by causing them to become $H_2O$, $CO_2$, and $N_2$, respectively. As the air-fuel ratio of the exhaust gas flowing into the three way catalyst body 62 becomes greater than the theoretical air-fuel ratio, the conversion efficiency of HC and CO of the three way catalyst body 62 increases. As the air-fuel ratio of the exhaust gas flowing into the three way catalyst body 62 becomes smaller than the theoretical air-fuel ratio, the conversion efficiency of NOx of the three way catalyst body 62 increases. When the air-fuel ratio of the exhaust gas flowing into the three way catalyst body 62 is in the vicinity of the theoretical air-fuel ratio, the three way catalyst body 62 simultaneously purifies the HC, CO, and NOx at a high conversion efficiency. Moreover, the three way catalyst body 62 is activated and purifies HC and the like only when it becomes an activation temperature or higher.

An exhaust gas temperature sensor 87 and an air-fuel ratio sensor 88 are provided at a portion of the exhaust pipe 24 that is more upstream than the catalytic device 60. The exhaust gas temperature sensor 87 detects the temperature of the exhaust gas that passes through the exhaust pipe 24. The air-fuel ratio sensor 88 detects the air-fuel ratio of the exhaust gas that passes through the exhaust pipe 24.

The ECU 2 is a controller based on a well-known microcomputer. The ECU 2 comprises a CPU, a memory, and an I/O bus. The CPU executes program. The memory is configured from a RAM, a ROM or the like and stores programs and data. The I/O bus performs the input/output of various signals.

The ECU 2 receives, via the I/O bus, detection signals from the respective sensors including the crank angle sensor 82, a engine coolant temperature sensor 83, an intake quantity sensor 86, and an accelerator sensor 85. The ECU 2 performs various computations based on these detection signals. The accelerator sensor 85 detects the accelerator aperture corresponding to the manipulated variable of the accelerator pedal operated by the driver.

The ECU 2 outputs a drive control signal to the ignition circuit device 27, the injector 16, the throttle valve 50, the intake VVT 32, and the exhaust VVT 42, respectively.

The ECU 2 includes, as its main functional elements, a valve timing control unit 102, an ignition control unit 104, an intake quantity control unit 106, and an injector control unit 108.

The valve timing control unit 102 controls the operation of the exhaust VVT 42 and the intake VVT 32. The valve timing control unit 102 appropriately changes the valve opening timing and the valve closing timing of the exhaust valve 20 and the valve opening timing and the valve closing timing of the intake valve 19 according to the operational status of the engine. The valve closing timing of the exhaust valve 20 and the valve opening timing of the intake valve 19 are changed so as to change the overlapping period where both the exhaust valve 20 and the intake valve 19 are opened in the vicinity of the exhaust top dead center; specifically, the period from the valve opening timing of the intake valve 19 to the valve closing timing of the exhaust valve 20. Otherwise, the valve closing timing of the exhaust valve 20 and the valve opening timing of the intake valve 19 are changed so as to change the period where both the exhaust valve 20 and the intake valve 19 are closed in the vicinity of the exhaust top dead center; specifically, the period from the valve closing timing of the exhaust valve 20 and the valve opening timing of the intake valve 19 (negative overlapping period). The valve timing control unit 102 changes the amount of burned gas remaining within the combustion chamber 14; that is, the internal EGR gas by changing the valve closing timing of the exhaust valve 20.

The ignition control unit 104 controls the power fed from the ignition circuit device 27 to the spark plug 15. The ignition control unit 104 changes the timing (ignition timing) that the spark plug 15 spark-discharges and ignites the mixture.

The intake quantity control unit 106 drives the throttle actuator 54 and changes the aperture of the throttle valve 50. This change changes the amount of air-intake (fresh air) that flows into the combustion chamber 14.

The injector control unit 108 changes the injection timing, injection amount (injection time) and the like of the fuel that is injected from the injector 16 to the combustion chamber 14.

The changes of the injection amount by the injector control unit 108 and the air-intake amount by the intake quantity control unit 106 or the valve timing control unit 102 changes the air-fuel ratio of the mixture within the combustion chamber 14.

Specifically, the injector control unit 108 controls the injection amount so that the air-fuel ratio of the mixture becomes a predetermined air-fuel ratio based on the air-intake amount detected by the intake quantity sensor 86. Note that, in this embodiment, the injector control unit 108 corrects the injection amount based on the air-fuel ratio detected by the air-fuel ratio sensor 88. This correction causes the air-fuel ratio to become the target air-fuel ratio more accurately.

Figure 3:
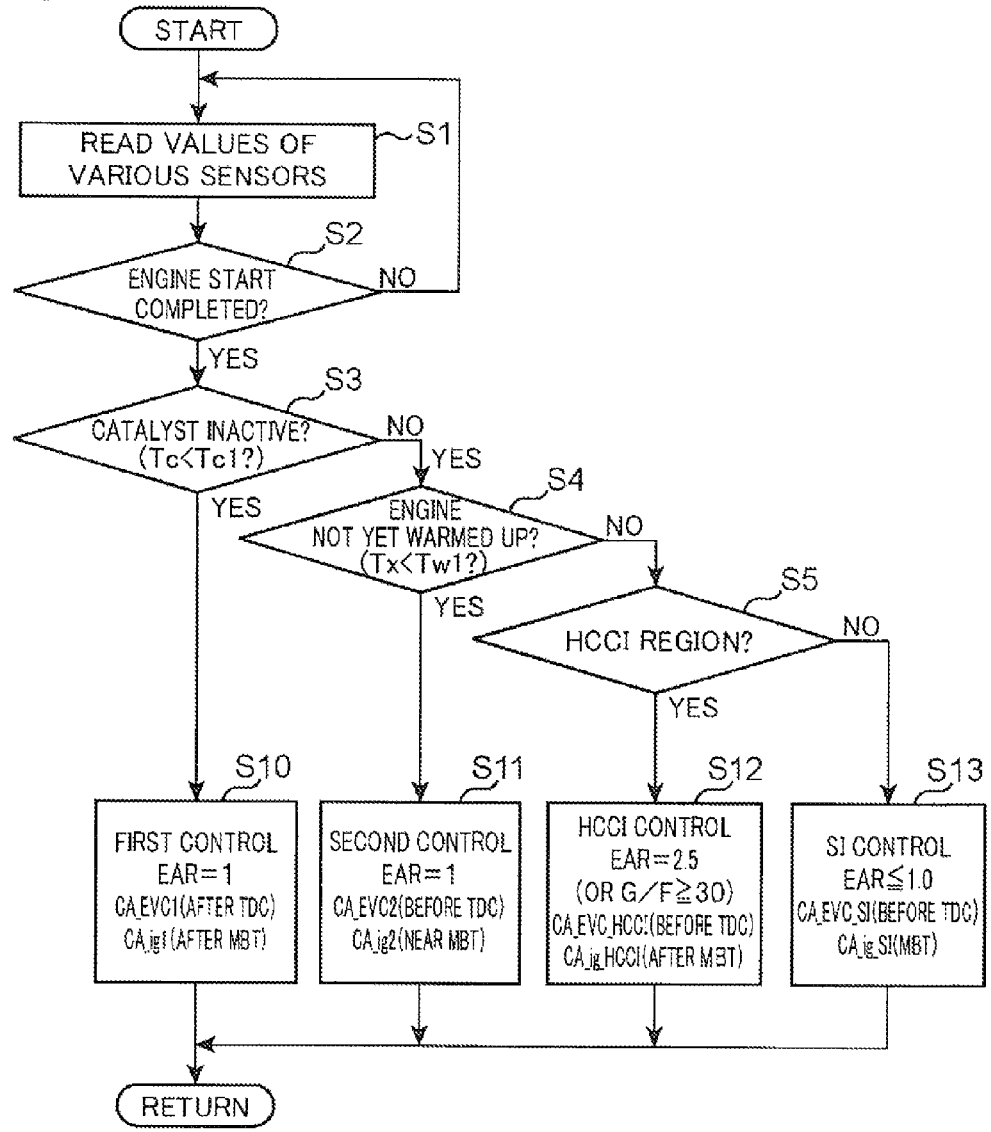
FIG. 3 is a flowchart showing the control method of the spark ignition engine according to the first embodiment of the present invention.

How the ECU 2 specifically controls the engine according to the driving conditions is now explained with reference to the flowchart of FIG. 3.

In step S1, the ECU 2 reads the temperature of the engine coolant detected by the engine coolant temperature sensor 83, the temperature of the exhaust gas within the exhaust pipe 24 that is more upstream than the catalytic device 60 detected by the exhaust gas temperature sensor 87, the air-intake amount detected by the intake quantity sensor 86, the detection signal detected by the crank angle sensor 82, and so on. Moreover, the ECU 2 calculates the engine revolution NE based on the detection signal from the crank angle sensor 82.

Subsequently, in step S2, the ECU 2 determines whether the start of the engine body 1 has been completed and engine body 1 has started autonomous rotation. In this embodiment, the ECU 2 determines that the start of the engine body 1 is completed when the engine revolution NE becomes a pre-set start determination revolution N1 or higher. The start determination revolution N1 is set, for example, to 500 rpm.

The ECU 2 returns to step S1 when the determination is NO in step S2 (start of the engine body 1 is incomplete). Meanwhile, the ECU 2 proceeds to step S3 when the determination is YES at step S2 (start of the engine body 1 is complete).

In step S3, the ECU 2 determines whether the three way catalyst body 62 is in an inactive state. In this embodiment, the ECU 2 estimates the temperature Tc of the three way catalyst body 62 based on the flow rate of the exhaust gas flowing into the catalytic device 60 after the engine was started to the present time, the temperature of such exhaust gas, and the air-fuel ratio of such exhaust gas. The ECU 2 determines that the three way catalyst body 62 is in an inactive state when the estimated temperature Tc of the three way catalyst body 62 is less than an activation temperature Tc1. The flow rate of the exhaust gas is calculated from the detected values of the intake quantity sensor 86 and the like. The temperature of the exhaust gas is detected by the exhaust gas temperature sensor 87. The air-fuel ratio is detected by the air-fuel ratio sensor 88. The activation temperature Tc1 is set, for example, to 300 degree celsius. In this embodiment, the intake quantity sensor 86, the exhaust gas temperature sensor 87, the air-fuel ratio sensor 88 and the ECU 2 function as the catalyst temperature detection device for estimating the temperature of the catalytic device 60.

A detection device for directly detecting the temperature of the catalytic device 60 may also be provided. In the foregoing case, the detection device directly detects the temperature Tc of the three way catalyst body 62. The ECU 2 determines whether this detected temperature is less than the activation temperature Tc1.

The ECU 2 proceeds to step S10 when the determination is YES in step S3 (estimated temperature Tc of the three way catalyst body 62 is less than the activation temperature Tc1 and the three way catalyst body 62 is determined to be in an inactive state). In step S10, the ECU 2 implements first control for activating the three way catalyst body 62.

In the first control, the injector control unit 108 adjusts the injection amount that is injected from the injector 16 and controls the air-fuel ratio of the mixture within the combustion chamber 14 to a first reference air-fuel ratio (fourth step). The first reference air-fuel ratio is set to a value between 14.5 or higher and 15.0 or less in the vicinity of the theoretical air-fuel ratio. The valve timing control unit 102 drives the exhaust VVT 42 and controls the valve closing timing CA_EVC of the exhaust valve 20 to a first valve closing timing CA_EVC1. The first valve closing timing CA_EVC1 is set on a more lag side than the exhaust top dead center (TDC). The first valve closing timing (crank angle) CA_EVC1 is set, for example, to ATDC (after top dead center) 5 degrees CA. The ignition control unit 104 implements a first step. Specifically, the ignition control unit 104 drives the ignition circuit device 27 and controls the ignition timing CA_ig to a first ignition timing CA_ig1. The first ignition timing CA_ig1 is set on a more lag side than the MBT (ignition timing in which the output of the engine become maximum). The first ignition timing (crank angle) CA_ig1 is set, for example, to ATDC (after top dead center) 25 degrees CA.

As described above, more exhaust gas of a high temperature is emitted toward the three way catalyst body 62 until the determination becomes NO in step S3; specifically, during the first period after the engine is started and until the three way catalyst body 62 is activated.

Specifically, the air-fuel ratio of the mixture within the combustion chamber 14 is set to be in the vicinity of the theoretical air-fuel ratio. Thus, increase in the heat capacity of the mixture caused by excess air is inhibited. This inhibits the temperature of gas after combustion from decreasing. Moreover, as a result of excess fuel being subject to endothermic reaction, decrease in the temperature of the mixture is inhibited. This increases the gas temperature after combustion. Moreover, the ignition timing is set on the more lag side. Thus, the temperature of the exhaust gas flowing toward the exhaust pipe 24 increases when the exhaust valve 20 is opened. In addition, the valve closing timing of the exhaust valve 20 is set on the more lag side than the exhaust top dead center. Thus, more exhaust gas of a high temperature flows toward the exhaust pipe 24.

Accordingly, with the spark ignition engine 100, since the first control including the first step and the fourth step is implemented during the first period, more energy among the combustion energy generated by the combustion of the mixture will flow toward the exhaust pipe 24. This causes the three way catalyst body 62 to be heated promptly.

Note that the valve closing timing CA_EVC of the exhaust valve 20 is the crank angle immediately before the buffer curve portion within the valve lift curve. The buffer curve portion is provided to buffer the collision noise that occurs between the exhaust valve 20 and the valve sheet when the exhaust valve 20 is closed. Specifically, the valve closing timing CA_EVC of the exhaust valve 20 is the crank angle at the point where the valve lift is 0.5 mm. Similarly, the valve closing timing of the intake valve is the crank angle immediately before the buffer curve portion within the valve lift curve. The valve opening timing of the exhaust valve 20 and the valve opening timing of the intake valve are crank angles immediately after the buffer curve portion within the valve lift curve. In the buffer curve portion, variation in the valve lift is relatively small and the absolute value of the valve lift is also small. The valve opening period of the intake valve 19 and the valve opening period of the exhaust valve 20 are the crank angle periods excluding the buffer curve portion of the valve opening side and the buffer curve portion of the valve closing side within the valve lift curve, and are periods where the air-intake can substantially flow into the engine body 1 and periods where the exhaust can be substantially emitted from the engine.

Here, when much combustion energy is emitted as exhaust energy toward the exhaust pipe 24, the cooling loss will decrease. Specifically, the energy supplied to the cylinder head 9 and the cylinder block 11 will decrease. Thus, the rise in temperature of the cylinder head 9 and the cylinder block 11 is inhibited. Specifically, the rise in the wall temperature of the combustion chamber 14 is inhibited. This prolongs the time required for warming up the engine body 1.

Figure 2:
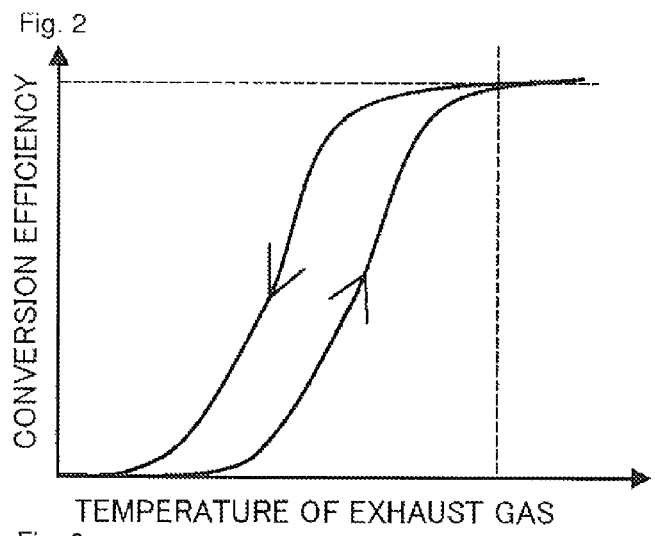
FIG. 2 is a graph showing the relationship of the exhaust gas temperature and the conversion efficiency of the three way catalyst body.

Meanwhile, the present inventors and others focused on the fact that the conversion efficiency of the three way catalyst body 62 has hysteresis characteristics relative to the influent exhaust gas temperature. FIG. 2 shows a graph representing the relationship of the exhaust gas temperature and the conversion efficiency of the three way catalyst body 62. The horizontal axis of FIG. 2 shows the temperature of the exhaust gas flowing into the three way catalyst body 62. The vertical axis of FIG. 2 shows the conversion efficiency of the three way catalyst body 62. As shown in the graph, the conversion efficiency of the three way catalyst body 62 increases pursuant to the rise in the temperature of the exhaust gas. Nevertheless, the conversion efficiency of the three way catalyst body 62 maintains a high value after the conversion efficiency once becomes a maximum value and the three way catalyst body 62 is activated even if the temperature of the exhaust gas is somewhat low. This is considered to be because the once-activated three way catalyst body 62 is maintained at a higher temperature with its own reaction heat even of the temperature of the influent exhaust gas decreases. Moreover, this is also considered to be because the three way catalyst body 62 is maintained at a high temperature by the radiant heat from the heated casing 61.

Based on the foregoing discovery that the activation of the three way catalyst body 62 is maintained after the three way catalyst body 62 is activated even if the temperature of the exhaust gas decreases, the present inventors and others reduced the temperature of the exhaust gas after the activation of the three way catalyst body 62. In addition, the present inventors and others realized the prompt warm-up of the engine body 1 while maintaining the activation of the three way catalyst body 62 by using the energy, which was used as the exhaust energy among the combustion energy, for raising the wall temperature of the combustion chamber 14.

Specifically, the ECU 2 proceeds to step S4 when the determination is NO in step S3 and it is determined that the three way catalyst body 62 is in an active state. In step S4, the ECU 2 determines whether the engine body 1 has been warmed up. In this embodiment, the ECU 2 determines that the engine is not warmed up if the temperature Tw of the engine coolant is less than a pre-set warm-up determination temperature Tw1. The warm-up determination temperature Tw1 is set, for example, to 80 degree celsius. The ECU 2 proceeds to step S11 if it is determined in step S4 that the engine body 1 has not been warmed up.

In step S11, the ECU 2 implements second control for promptly warming up the engine body 1. The second control is the control of reducing the temperature of the exhaust gas and thereby reducing the exhaust energy in comparison to the first control implemented in step S10, and consequently increasing the cooling loss. Specifically, the ECU 2 implements a second step of increasing the ratio of burned gas contained in the mixture within the combustion chamber 14 more than during the first control, and a third step of igniting the mixture in which the ratio of burned gas has increased.

In the second control, the injector control unit 108 adjusts the injection amount that is injected from the injector 16, and controls the air-fuel ratio of the mixture within the combustion chamber 14 to a second reference air-fuel ratio. The second reference air-fuel ratio is set to a value between 14.5 or higher and 15.0 or less in the vicinity of the theoretical air-fuel ratio. Accordingly, in this embodiment, the fourth step of controlling the air-fuel ratio of the mixture within the combustion chamber 14 to the vicinity of the theoretical air-fuel ratio is also continued in the second control. The valve timing control unit 102 implements a second step. Specifically, the valve timing control unit 102 drives the exhaust VVT 42 and controls the valve closing timing CA_EVC of the exhaust valve 20 to a second valve closing timing CA_EVC2. The second valve closing timing CA_EVC2 is set on a more advance side than the exhaust top dead center (TDC). The second valve closing timing (crank angle) CA_EVC2 is set, for example, to BTDC (before top dead center) 90 degrees CA. Moreover, the valve timing control unit 102 drives the intake VVT 32 and controls the valve opening timing of the intake valve 19 to be on a more lag side than the valve closing timing of the exhaust valve 20. Subsequently, the ECU 2 closes both the intake valve 19 and the exhaust valve 20 and realizes a negative overlap thereof in the vicinity of the exhaust top dead center.

In addition, the ignition control unit 104 implements a third step. Specifically, the ignition control unit 104 drives the ignition circuit device 27 and controls the ignition timing CA_ig to a second ignition timing CA_ig2. The second ignition timing CA_ig2 is set on a more advance side than the first ignition timing CA_ig1. In this embodiment, the second ignition timing CA_ig2 is set to be advanced approximately in proportion to the temperature Tw of the engine coolant. For example, the second ignition timing (crank angle) CA_ig2 is set within the range from ATDC (after top dead center) 20 degrees CA to BTDC 20 degrees CA as the MBT when the temperature Tw of the engine coolant is within the range from 20 degree celsius to 80 degree celsius.

Accordingly, the cooling loss is increased until the determination becomes NO in step S4; specifically, during the second period after the three way catalyst body 62 is activated and the engine body 1 is warmed up and the temperature Tw of the engine coolant becomes the warm-up determination temperature Tw1 or higher, and the energy discharged to the cylinder block 11 and the cylinder head 9 is increased.

Specifically, during the second period, the valve closing timing of the exhaust valve 20 is controlled more to the advance side. Thus, the amount of high temperature burned gas; that is, the internal EGR gas remaining within the combustion chamber 14 without being emitted toward the exhaust pipe 24 will increase. The gas temperature within the combustion chamber 14 is increased as a result of the high temperature internal EGR gas being compressed. The rise in the gas temperature within the combustion chamber 14 increases the energy that is discharged toward the cylinder block 11 and the cylinder block 9. In particular, the exhaust valve 20 and the intake valve 19 are overlapping negatively. Thus, the internal EGR gas volume will increase as a result of the scavenging of the combustion chamber 14 being inhibited. Moreover, the ignition timing is more advanced than during the first control. Thus, the high temperature gas after combustion will remain in the combustion chamber 14 for a longer period of time. This causes more thermal energy to be supplied toward the cylinder block 11 and the cylinder head 9. In addition, the air-fuel ratio of the mixture within the combustion chamber 14 is set to be in the vicinity of the theoretical air-fuel ratio. Thus, the heat capacity of the mixture will decrease. The decrease in the heat capacity inhibits the temperature of gas after combustion from decreasing. Moreover, as a result of the air-fuel ratio being set in the vicinity of the theoretical air-fuel ratio, the endothermic reaction caused by excess fuel is avoided. This inhibits the temperature of the mixture from decreasing and increases the gas temperature after combustion, and consequently the temperature of the internal EGR gas.

As described above, with the spark ignition engine 100, more energy among the combustion energy generated by the combustion of the mixture is supplied to the cylinder block 11 and the cylinder head 9 during the second period. This realizes the prompt warm-up of the engine body 1. Moreover, the air-fuel ratio of the mixture within the combustion chamber 14 is set to be in the vicinity of the theoretical air-fuel ratio. Thus, the HC, CO, and NOx emitted from the engine body 1 are purified by the three way catalyst. This increases the exhaust gas performance.

After the engine body 1 is warmed up by the second control in step S11, the ECU 2 implements the normal control of step S5 and steps S12, S13. In this embodiment, homogeneous charge compression ignition combustion is implemented in the HCCI region set to a low-speed, low-load region where the engine revolution is low and the engine load is low. The homogeneous charge compression ignition combustion is a combustion mode where fuel is injected during the intake stroke or the like and the mixture self-ignites simultaneously and repetitively at various locations within the combustion chamber 14. Spark-ignited combustion is implemented in the other regions. The spark-ignited combustion is a combustion mode of forcibly igniting the mixture with the spark from the spark plug 15 and thereby combusting the overall mixture based on flame propagation.

Specifically, the ECU 2 proceeds to step S5 when the determination is NO in step S4 and it is determined that the temperature Tw of the engine coolant has become the warm-up determination temperature Tw1 or higher and the engine body 1 has been warmed up. In step S5, the ECU 2 determines whether the current driving conditions are in the HCCI region. When this determination is YES and the current driving conditions are in the HCCI region, the ECU 2 proceeds to step S12 and implements HCCI control.

In the HCCI control, the injector control unit 108 adjusts the injection amount that is injected from the injector 16, and controls the excess air ratio EAR of the mixture within the combustion chamber 14 to a value of 2 or higher (for example, 2.5) (seventh step), or controls the relationship G/F of the total weight G of the gas and the weight F of the fuel injected into the combustion chamber 14 so that it becomes 30 or higher (eighth step). Moreover, the injector control unit 108 injects the fuel during the intake stroke. The total weight G of the gas is the total of the weight of burned gas contained in the combustion chamber 14; that is, the weight of internal EGR gas, and the weight of fresh air.

Moreover, the valve timing control unit 102 controls the valve closing timing CA_EVC of the exhaust valve 20 to an HCCI valve closing timing CA_EVC_HCCI (fifth step). The valve timing control unit 102 controls the valve opening timing of the intake valve 19 to be on a more lag side than the valve closing timing of the exhaust valve 20. Subsequently, the valve timing control unit 102 causes the intake valve 19 and the exhaust valve 20 to negatively overlap. The HCCI valve closing timing CA_EVC_HCCI is set to a timing that is on a more advance side than the first valve closing timing CA_EVC1.

The HCCI valve closing timing CA_EVC_HCCI is set to a timing that is on a more advance side than the exhaust top dead center. Each HCCI valve closing timing CA_EVC_HCCI is set to an appropriate value according to the engine revolution and the engine load. For example, the HCCI valve closing timing (crank angle) CA_EVC_HCCI is set to BTDC 60 degrees CA.

The ignition control unit 104 ignites the mixture by the spark plug 15 so as to assist the homogeneous charge compression ignition combustion. The ignition control unit 104 drives the ignition circuit device 27 and controls the ignition timing to an HCCI ignition timing CA_ig_HCCI. The HCCI ignition timing CA_ig_HCCI is set to be in the vicinity of the compression top dead center (TDC). Each HCCI ignition timing CA_ig_HCCI is set to an appropriate value according to the engine revolution and the engine load.

As described above, in the HCCI region, the mixture within the combustion chamber 14 is subject to homogeneous charge compression ignition combustion which will not easily result in an misfire even under an extremely lean atmosphere as a result of its air-fuel ratio being set to be leaner than the theoretical air-fuel ratio. This leaning considerably reduces the NOx that is generated during combustion.

Specifically, the valve closing timing of the exhaust valve 20 is controlled to be on the more advance side. Thus, the internal EGR gas volume will increase. This increase in the internal EGR gas volume raises the temperature of the mixture to a temperature which enables self-ignition, and realizes the homogeneous charge compression ignition combustion while reducing the NOx. Note that, in this embodiment, the ignition control unit 104 ignites the mixture and assists the combustion as described above. This assistance enables the reliable avoidance of misfire.

Meanwhile, when the determination is NO in step S5 and the current driving conditions are not in the HCCI region, the ECU 2 proceeds to step S13 and implements SI control.

In the SI control, the injector control unit 108 adjusts the injection amount that is injected from the injector 16, and controls the excess air ratio EAR of the mixture within the combustion chamber 14 to 1.0 or less. Moreover, the ignition control unit 104 ignites the mixture by the spark plug 15. The ignition control unit 104 controls the ignition timing CA_ig to an SI combustion ignition timing CA_ig_SI. The SI combustion ignition timing CA_ig_SI is set to MBT. Moreover, the valve timing control unit 102 controls the valve closing timing CA_EVC of the exhaust valve 20 to an SI valve closing timing CA_EVC_SI. The SI valve closing timing CA_EVC_SI is on a more advance side than the first valve closing timing CA_EVC1 as with the HCCI valve closing timing CA_EVC_HCCI. Each SI valve closing timing CA_EVC_SI is set to an appropriate value according to the engine revolution and the engine load.

Accordingly, the spark-ignited combustion is performed and proper combustion is realized in regions other than the HCCI region; specifically, high rotation regions where the heat receiving period of the mixture is short and the self-ignition of the mixture is difficult, and in the high load regions that are easily subject to abnormal combustion such as preignition associated with the increase of fuel.

Note that, if the spark ignition engine includes a supercharger, the compressed self ignition may be performed while avoiding preignition even in the high load regions by reducing the effective compression ratio of the engine while increasing the air-intake amount based on supercharging, and thereby reducing the temperature within the combustion chamber 14. In the foregoing case, the injector control unit 108 controls the excess air ratio EAR of the mixture within the combustion chamber 14 to 2.0 or higher. The ignition control unit 104 controls the ignition timing to a timing that is on the more lag side than MBT.

FIG. 4 shows the control results upon implementing the foregoing control.

As a result of the fourth step included in the first control being implemented after the engine is started, the air-fuel ratio of the mixture within the combustion chamber 14 is controlled to a theoretical air-fuel ratio (excess air ratio EAR is 1.0). Moreover, as a result of the first step included in the first control being implemented, the ignition timing CA_ig is controlled to the first ignition timing CA_ig1 that is on the more lag side than MBT. The valve closing timing CA_EVC of the exhaust valve 20 is controlled to the first valve closing timing CA_EVC1 that is on the more lag side than TDC. Based on the foregoing control, the temperature Tex of the exhaust gas is promptly raised to a higher temperature Tex1 (for example, 800 degree celsius) or more. High energy is thereby discharged toward the exhaust pipe 24. This inhibits the rise in the temperature Tw of the engine coolant. Moreover, this causes the temperature of the three way catalyst body 62 to rise quickly, and the activation temperature Tc1 is reached at time t1 (for example, 20 seconds after the engine is started).

When the temperature Tc of the three way catalyst body 62 becomes an activation temperature Tc1 or higher, the second control is implemented. As described above, in the second control, the fourth step is continued and the air-fuel ratio of the mixture within the combustion chamber 14 is maintained at the theoretical air-fuel ratio (excess air ratio EAR is 1.0). Moreover, the ignition timing CA_ig is controlled to the second ignition timing CA_ig2 as a result of the third step included in the second control being implemented, and the valve closing timing CA_EVC of the exhaust valve 20 is controlled to the second valve closing timing CA_EVC2 as a result of the second step included in the second control being implemented. As described above, the second ignition timing CA_ig2 is set on the more advance side than the first ignition timing CA_ig1. The second valve closing timing CA_EVC2 is on the more advance side than TDC. In the second control, the temperature Tex of the exhaust gas is reduce to the vicinity of Tex2 (for example, 300 degree celsius). This inhibits the energy that is discharged toward the exhaust pipe 24 and increases the cooling loss. This increase in the cooling loss increases the temperature Tw of the engine coolant. Consequently, the engine coolant temperature Tw becomes the warm-up determination temperature Tw1 or higher at time t2 (for example, 80 seconds after the engine is started). Here, although the temperature Tex of the exhaust gas will decrease, as shown in FIG. 4, the temperature Tc of the three way catalyst body 62 is maintained at the activation temperature Tc1 or higher at time t2, and the three way catalyst body 62 is maintaining its active state. Note that the temperature Tex of the exhaust gas in FIG. 4 is the gas temperature within the exhaust port 18.

When the temperature Tw of the engine coolant becomes the warm-up determination temperature Tw1 or higher, the normal control is implemented. In FIG. 4, the HCCI control is implemented (seventh or eighth step). Specifically, as described above, the excess air ratio EAR of the mixture within the combustion chamber 14 is controlled to 2.5. Moreover, the G/F is controlled to 30 or higher. The ignition timing CA_ig is controlled to the HCCI ignition timing CA_ig_HCCI. The valve closing timing CA_EVC of the exhaust valve 20 is controlled to the HCCI valve closing timing CA_EVC_HCCI (fifth step). The foregoing control realizes the homogeneous charge compression ignition combustion within the combustion chamber 14. The HCCI valve closing timing CA_EVC_HCCI is a timing that is on the more advance side than the first valve closing timing CA_EVC1 and on the more advance side than TDC.

As described above, according to the spark ignition engine 100, during the first period after the engine is started and until the three way catalyst body 62 is activated, the air-fuel ratio of the mixture is set to be in the vicinity of the theoretical air-fuel ratio, and the ignition timing is set on the more lag side than MBT. This increases the exhaust energy that flows into the three way catalyst body 62 and causes the three way catalyst body 62 to activate more promptly. In addition, according to the spark ignition engine 100, during the second period after the three way catalyst body 62 is activated until the engine body 1 is warmed up, the air-fuel ratio of the mixture is set to be in the vicinity of the theoretical air-fuel ratio, and the internal EGR gas volume increases. This reduces the exhaust energy and increases the cooling loss; that is, the energy that is supplied to the cylinder block 11 and the like. In addition, this maintains the activation of the three way catalyst body 62 and causes the engine body 1 to warm up promptly.

In particular, during the second period, the valve closing timing of the exhaust valve 20 is controlled on the more advance side than the exhaust top dead center and the first period. This more reliably increases the internal EGR gas volume.

Moreover, the valve closing timing of the exhaust valve 20 after the engine body 1 is warmed up is set on the more advance side than the valve closing timing of the exhaust valve 20 during the first period, and controlled to a value that is closer to the valve closing timing of the exhaust valve 20 during the second period. Thus, the variation in the valve closing timing of the exhaust valve 20 can be inhibited before and after the completion of the second period; that is, before and after the warm-up of the engine body 1 is completed. This enhances the controllability of the exhaust valve 20. Specifically, this more promptly causes the valve closing timing of the exhaust valve 20 to become an appropriate timing after the engine body 1 is warmed up.

The second embodiment of the control unit of the spark ignition engine according to the present invention is now explained with reference to FIG. 5 and FIG. 6.

The spark ignition engine according to the second embodiment differs from the first embodiment with respect to the configuration of the exhaust valve drive mechanism 40. Moreover, the control means of the valve timing control unit 102 according to the second embodiment is different from the first embodiment. The remaining configuration of the second embodiment is the same as the first embodiment. Here, only the configuration of the exhaust valve drive mechanism 40 and the control routine of the valve timing control unit 102 are explained.

The exhaust valve drive mechanism 40 according to the second embodiment includes a VVL capable of changing the lift of the exhaust valve 19 in substitute for the exhaust VVT 42. This VVL is an ON/OFF-type variable valve lift mechanism which enables or disables the function of pressing the exhaust valve 20 during the intake stroke. This VVL is capable of opening the exhaust valve 20 not only during the exhaust stroke, but also during the intake stroke. Moreover, this VVL is capable of switching whether to execute or stop the valve opening operation of the exhaust valve 20 during the intake stroke. When the exhaust valve 20 is opened during the intake stroke, the high temperature burned gas that was once discharged toward the exhaust port 18 during the exhaust stroke flows backward into the combustion chamber 14 once again.

Here, in this specification, the exhaust valve 20 opening during the exhaust stroke means that its valve opening period mainly overlaps with the exhaust stroke, and does not necessarily mean that the entire valve opening period of the exhaust valve 20 is in the exhaust stroke. Moreover, the exhaust valve 20 opening during the intake stroke means that its valve opening period mainly overlaps with the intake stroke, and does not necessarily mean that the entire valve opening period of the exhaust valve 20 is in the intake stroke. For example, in this specification, when the exhaust valve 20 is opened during the exhaust stroke, this includes cases where the exhaust valve 20 begins to open immediately before the exhaust stroke (at the end of the expansion stroke).

The VVL includes, for example, a sub cam and a lost motion mechanism. The sub cam presses the exhaust valve 20 during the intake stroke separately from the ordinary cam for driving the exhaust valve 20 (cam which presses the exhaust valve 20 during the exhaust stroke). The lost motion mechanism cancels the driving force of the sub cam from being transmitted to the exhaust valve 20. The VVL structured as described above is well known, and is disclosed, for example, in Japanese Published Unexamined Patent Application No. 2007-85241 (referred to as a "valve drive switching mechanism" in the foregoing publication).

The valve timing control unit 102 according to the second embodiment controls the operation of the intake VVT 32 and appropriately changes the valve opening timing and the valve closing timing of the intake valve 19 according to the operational status of the engine as with the first embodiment. Meanwhile, unlike the first embodiment, the valve timing control unit 102 drives the VVL and executes or stops the valve opening of the exhaust valve 20 during the intake stroke. When the valve opening of the exhaust valve 20 during the intake stroke is executed by the valve timing control unit 102, the backflow of the burned gas into the combustion chamber 14 is switched. This changes the ratio of the internal EGR gas volume contained in the mixture.

The control routine in the second embodiment is now explained with reference to the flowchart of FIG. 6. Here, only control routine of the first control, the second control and the normal control is different from the first embodiment. Accordingly, the explanation of other control is omitted. Specifically, step S1 to step S5 are the same as the first embodiment. From step S20 to step S23, the routine other than the control routine of the valve timing control unit 102 is the same as the first embodiment.

The ECU 2 proceeds to step S20 when the determination is YES in step S3 (when it is determined that the three way catalyst body 62 is in an inactive state). In step S20, the ECU 2 implements the first control including the first step and the fourth step for activating the three way catalyst body 62. In the second embodiment, the valve timing control unit 102 stops the valve opening of the exhaust valve 20 during the intake stroke and only opens the exhaust valve 20 during the exhaust stroke in the first control. The time-area of the valve lift of the exhaust valve 20 during the intake stroke in the first control is set to be 0.

The exhaust valve 20 being opened only during the exhaust stroke as described above inhibits the internal EGR gas volume, and increases the high temperature exhaust gas that flows into the three way catalyst body 62. This high temperature exhaust gas warms and promptly activates the three way catalyst body 62.

In cases where the engine body 1 has not been warmed up after the three way catalyst body 62 is activated by the first control (temperature Tc of the three way catalyst body 62 becomes the activation temperature Tc1 or higher), the ECU 2 proceeds to step S4. The ECU 2 proceeds to step S21 upon determining that the engine body 1 has not been warmed up in step S4. In step S21, the ECU 2 implements the second control including the second step, the third step and the fourth step for promptly warming up the engine.

In the second embodiment, the valve timing control unit 102 executes the valve opening of the exhaust valve 20 during the intake stroke and opens the exhaust value 20 during the intake stroke, in addition to during the exhaust stroke, in the second step. Specifically, as shown in FIG. 5, the exhaust valve 20 foremost begins to open in the vicinity of the expansion bottom dead center (BDC on the left side in FIG. 5), and closes in the vicinity of the exhaust top dead center (TDC). Subsequently, the exhaust valve 20 once again begins to open at a prescribed delayed timing from the exhaust top dead center (TDC), and closes in the vicinity of the intake bottom dead center (BDC on the right side in FIG. 5).

As described above, when the exhaust valve 20 is opened during the intake stroke, burned gas flows backward into the combustion chamber 14. This backflow of burned gas increase the ratio of the internal EGR gas volume in the mixture within the combustion chamber 14. When this great amount of high temperature internal EGR gas is compressed, the gas temperature within the combustion chamber 14 will increase. The rise in the gas temperature within the combustion chamber 14 increases the energy that is discharged toward the cylinder block 11 and the cylinder head 9, and promptly warms up the engine body 1.

After the engine body 1 is warmed up by the second control, the ECU 2 performs normal control as with the first embodiment; specifically, it implements the HCCI control and the SI control. In the second embodiment, the valve timing control unit 102 executes the valve opening of the exhaust valve 20 during the intake stroke and also opens the exhaust valve 20 during the intake stroke, in addition to during the exhaust stroke, in the HCCI control (sixth step). The valve timing control unit 102 stops the valve opening of the exhaust valve 20 during the intake stroke and only opens the exhaust valve 20 during the exhaust stroke in the SI control. Note that, in the second embodiment, the valve timing control unit 102 controls the valve lift value of the exhaust valve during the intake stroke to be smaller than the area during the second control in the HCCI control. This increases the amount of fresh air within the combustion chamber 14.

Accordingly, the exhaust valve 20 is opened during the intake stroke, in addition to during the exhaust stroke, in the HCCI regions which are set to low-speed and low-load. Thus, a large internal EGR gas volume is secured. This raises the mixture to a temperature enabling self ignition and realizes the homogeneous charge compression ignition combustion. Meanwhile, in a high rotation and high load region, the exhaust valve 20 is opened only during the exhaust stroke. This increases the amount of fresh air within the combustion chamber 14 and realizes proper spark-ignited combustion.

As described above, according to the spark ignition engine according to the second embodiment, the exhaust valve 20 is opened only during the exhaust stroke in the first period after the engine is started and until the three way catalyst body 62 is activated. Thus, the exhaust energy that flows into the three way catalyst body 62 will increase. This causes the three way catalyst body 62 to activate promptly. Moreover, the exhaust valve 20 is opened during the intake stroke, in addition to during the exhaust stroke, in the second period after the three way catalyst body 62 is activated and until the engine body 1 is warmed up. Thus, the internal EGR gas volume will increase. This increases the energy that is supplied to the cylinder block 11 and the like, and promptly warms up the engine body 1 while maintaining the activation of the three way catalyst body 62.

Here, the exhaust valve 20 may also be opened during the intake stroke, in addition to during the exhaust stroke, in regions other than the HCCI region set to low-speed and low-load after the engine body 1 is warmed up.

Moreover, in the first control, the exhaust valve 20 may be opened during the intake stroke in addition to during the exhaust stroke. However, in the foregoing case, as shown in FIG. 5, the time-area of the valve lift (broken line in FIG. 5) of the exhaust valve 20 during the intake stroke in the first control is set to be smaller than the time-area of the valve lift of the exhaust valve 20 during the intake stroke in the second control. This inhibits the ratio of the internal EGR gas volume in the first period and increase the ratio of the internal EGR gas volume in the second period. The exhaust energy can be increased as a result of the ratio of the internal EGR gas volume being inhibited. This causes the three way catalyst body 62 to activate promptly. The energy supplied to the cylinder block 11 and the like can be increased as a result of the ratio of the internal EGR gas volume being increased. This causes the engine body 1 to warm up promptly.

Moreover, preferably, the time-area of the valve lift of the exhaust valve 20 during the intake stroke in the normal control is greater than the time-area of the valve lift of the exhaust valve 20 during the intake stroke in the first control. According to the foregoing configuration, variation in the valve lift of the exhaust valve 20 can be inhibited before and after the completion of the second period (time when the engine body 1 is warmed up); that is, before and after the warm-up of the engine body 1 is complete. This enhances the controllability of the exhaust valve 20.

Moreover, in the present invention, the combustion mode and control method after the engine body 1 is warmed up are not limited to the above. However, with the present invention, the engine body 1 can be warmed up promptly. This increases the wall temperature of the combustion chamber 14 and raises the temperature of the mixture within the combustion chamber 14 to a temperature which enables self-ignition. Accordingly, as described above, when performing the homogeneous charge compression ignition combustion after the engine body 1 is warmed up, this is particularly effective since the homogeneous charge compression ignition combustion can be implemented sooner. In addition, when the homogeneous charge compression ignition combustion with an excess air ratio EAR of 2 or higher or a G/F of 30 or higher is implemented promptly, the generation of NOx is inhibited. Moreover, the homogeneous charge compression ignition combustion has higher thermal efficiency in comparison to the spark-ignited combustion. Thus, the fuel consumption performance is improved.

Moreover, the present invention is also effective in cases where the mixture is subject to stratified spark-ignited combustion as a result of such mixture with an excess air ratio EAR of 2 or higher or a G/F of 30 or higher being ignited after the engine body 1 is warmed up (ninth step, tenth step). With the stratified spark-ignited combustion, the air-fuel ratio of the mixture in the vicinity of the spark plug 15 is increased while maintaining the excess air ratio EAR of the overall mixture to be 2 or higher or maintaining the G/F of the overall mixture to be 30 or higher. With the stratified spark-ignited combustion, a flame kernel is generated in the vicinity of the spark plug 15, and the overall mixture is combusted based on the propagation of such flame kernel. Accordingly, the wall temperature of the combustion chamber 14 needs to be sufficiently high in order to favorably propagate the flame across the entire mixture within the combustion chamber. Accordingly, the present invention which enables the prompt warm-up of the engine is able to promptly realize favorable stratified spark-ignited combustion. The realization of this stratified spark-ignited combustion improves the fuel consumption performance. Note that, when implementing the stratified spark-ignited combustion, the valve timing control unit 102 and the injector control unit 108 adjust the EGR gas volume flowing into the combustion chamber 14 and the injection amount that is injected from the injector 16, control the excess air ratio EAR to a value that is 2 or higher or control the G/F to a value that is 30 or higher relative to the theoretical air-fuel ratio of the mixture within the combustion chamber 14, and inject the fuel into the combustion chamber 14 in the vicinity of the compression top dead center. Moreover, the ignition control unit 104 drives the ignition circuit device 27 and controls the ignition timing to MBT.

Moreover, the three way catalyst body 62 will suffice so as long as it is able to purify the HC, CO and NOx in a state where the air-fuel ratio of the exhaust gas is in the vicinity of the theoretical air-fuel ratio. The three way catalyst body 62 may include, for example, a function of adsorbing the NOx in addition to the foregoing purification function.

As described above, the present invention provides a method of controlling a spark ignition engine having a spark plug capable of igniting a mixture within a combustion chamber formed in a cylinder, a catalyst provided at an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio, and catalyst temperature detection device for detecting or estimating a temperature of the catalyst, wherein the spark ignition engine is capable of igniting a mixture in a combustion chamber and changing the opening/closing timing of at least an exhaust valve of the engine, wherein the control method includes: a first step of igniting the mixture at an ignition timing that is set to be on a more lag side than an MBT, which is an ignition timing in which an output torque of the engine becomes maximum, during a period from the time at which the start of the engine is completed and the engine starts autonomous rotation to the time at which a temperature of the catalyst detected or estimated by the catalyst temperature detection device becomes higher than a predetermined temperature; a second step of changing the valve opening timing and/or valve closing timing of the exhaust valve so that a ratio of burned gas contained in the mixture within the combustion chamber becomes higher than the ratio of the burned gas during the implementation of the first step from the time at which the temperature of the catalyst detected or estimated by the catalyst temperature detection device becomes higher than a predetermined temperature; and a third step of igniting the mixture within the combustion chamber from the time at which the temperature of the catalyst detected or estimated by the catalyst temperature detection device becomes higher than a predetermined temperature.

With the present invention, the first step is executed during the first period from the time at which the start of the engine is completed and the engine starts autonomous rotation to the time at which the catalyst reaches a predetermined temperature (until the catalyst is activated). In the first step, the mixture is ignited at a timing that is set to be on the more lag side than the MBT and which is closer to the exhaust stroke. Thus, the temperature of the exhaust gas that is emitted to the exhaust passage in the exhaust stroke can be increased. This increase in the temperature of the exhaust gas can promptly raise the catalyst to the activation temperature.

In addition, with the present invention, the second step and the third step are executed after the catalyst is activated. In the second step and the third step, the ratio of burned gas contained in the mixture is increased, and the mixture with a high ratio of burned gas is ignited and combusted. When a great amount of high temperature burned gas is compressed, the temperature inside the combustion chamber becomes a higher temperature. This temperature rise within the combustion chamber causes the engine to warm up more promptly (warm-up of the engine to be completed promptly).

When the second step is implemented and the ratio of burned gas contained in the mixture increases, the exhaust energy that flows into the catalyst decreases. Nevertheless, the conversion of the catalyst capable of purifying hydrocarbon, carbon monoxide and nitrogen oxide has hysteresis characteristics relative to the temperature of the influent exhaust gas. Thus, the catalyst that was raised to the activation temperature based on the implementation of the first step maintains its active state even when the second step is implemented. This realizes the prompt warm-up of the engine while maintaining the active state of the catalyst.

In the present invention, preferably, during the third step, the mixture is ignited at an ignition timing that is set on a more advance side than the ignition timing in the first step.

With this method, the timing of igniting the mixture is advanced in the third step that is implemented after the catalyst becomes an activated state. This advancement of the ignition timing reduces the energy that is emitted to the exhaust passage and causes the temperature inside the combustion chamber to be a higher temperature. This realizes the warm-up of the engine even more promptly.

Moreover, in the present invention, preferably, the control method further includes a fourth step of setting the air-fuel ratio of the mixture within the combustion chamber to be in the vicinity of the theoretical air-fuel ratio at least during the period from the time at which the start of the engine is completed and the engine starts autonomous rotation to the time at which the temperature of the catalyst detected or estimated by the catalyst temperature detection device becomes higher than a predetermined temperature.

Combustion of the mixture in the vicinity of the theoretical air-fuel ratio increases the gas temperature after the combustion within the combustion chamber. Thus, with this method, the gas temperature after the combustion within the combustion chamber will at least become higher during the period until the catalyst temperature reaches the activation temperature. This rise in gas temperature promotes the activation of the catalyst.

Moreover, preferably, the fourth step is continued even after the time at which the temperature of the catalyst detected or estimated by the catalyst temperature detection device becomes higher than a predetermined temperature.

According to this method, the catalyst more reliably purifies the hydrocarbon, carbon monoxide and nitrogen oxide contained in the exhaust gas after the catalyst is activated.

Moreover, in the present invention, preferably, the engine further includes engine coolant temperature detection device for detecting a temperature of the engine coolant, the second step is implemented from the time at which the temperature of the catalyst detected or estimated by the catalyst temperature detection device becomes higher than a predetermined temperature to the time at which the temperature of the engine coolant detected by the engine coolant temperature detection device exceeds a predetermined temperature, and, in the second step, the exhaust valve is closed at a valve closing timing that is set on a more advance side than an exhaust top dead center and set on a more advance side than the valve closing timing of the exhaust valve during the implementation of the first step.

With this method, in the second step, the amount of burned gas (so-called internal EGR gas) remaining within the combustion chamber without being emitted from the combustion chamber to the exhaust passage will increase, and the ratio of burned gas contained in the mixture within the combustion chamber will consequently increase. Thus, in comparison to the case where the ratio of burned gas is increased based on the method (so-called external EGR) where the burned gas emitted from the exhaust passage is caused to once flow backward to the intake passage side and then introduced into the combustion chamber once again from the intake passage, the temperature of burned gas is maintained at a high temperature. This more reliably increases the temperature of the mixture within the combustion chamber.

In the foregoing method, preferably, the control method further includes a fifth step of closing the exhaust valve at a valve closing timing that is set on a more advance side than the valve closing timing of the first step from the time at which the temperature of the engine coolant detected by the engine coolant temperature detection device becomes higher a predetermined temperature.

According to the foregoing configuration, variation in the valve closing timing of the exhaust valve is reduced in cases where the temperature of the engine coolant is lower and higher than a predetermined temperature; specifically, before and after the warm-up of the engine. This more reliably realizes the change of the valve closing timing of the exhaust valve to a more appropriate timing after the engine is warmed up.

Moreover, in the present invention, preferably, the engine further includes engine coolant temperature detection device for detecting a temperature of the engine coolant, the second step is implemented from the time at which the temperature of the catalyst detected or estimated by the catalyst temperature detection device becomes higher than a predetermined temperature to the time at which the temperature of the engine coolant detected by the engine coolant temperature detection device exceeds a predetermined temperature, and, in the second step, the exhaust valve is opened during an intake stroke in addition to during an exhaust stroke, and a time-area of a valve lift of the exhaust valve during the intake stroke becomes greater than the time-area in the first step.

With this method, in the second step, high temperature burned gas that was emitted to the exhaust passage during the exhaust stroke once again flows backward into the combustion chamber 14, and the ratio of burned gas contained in the mixture within the combustion chamber consequently increases. Thus, in comparison to the case where the ratio of burned gas is increased based on the method (so-called external EGR) where the burned gas emitted from the exhaust passage is caused to once flow backward to the intake passage side and then introduced into the combustion chamber once again from the intake passage, the temperature of burned gas is maintained at a high temperature. This more reliably increases the temperature of the mixture within the combustion chamber.

In the foregoing method, preferably, the control method further includes a sixth step of opening the exhaust valve during an intake stroke in addition to during an exhaust stroke from the time at which the temperature of the engine coolant detected by the engine coolant temperature detection device exceeds a predetermined temperature, and causing a time-area of a valve lift of the exhaust valve during the intake stroke to be greater than the time-area in the first step.

According to the foregoing configuration, difference in the valve lift of the exhaust valve and the valve lift of the exhaust valve after the engine is warmed up is reduced in cases where the temperature of the engine coolant is lower and higher than a predetermined temperature; specifically, before and after the warm-up of the engine. This more reliably realizes the change of the exhaust valve to a more appropriate valve lift after the engine is warmed up.

In the present invention, preferably, the engine further includes engine coolant temperature detection device for detecting a temperature of the engine coolant, and the control method further includes a seventh step of implementing stratified spark-ignited combustion by setting an excess air ratio EAR of the mixture within the combustion chamber to 2 or higher and igniting the mixture within the combustion chamber from the time at which the temperature of the engine coolant detected by the engine coolant temperature detection device exceeds a predetermined temperature.

Moreover, in the present invention, preferably, the engine further includes engine coolant temperature detection device for detecting a temperature of the engine coolant, and the control method further includes an eighth step of implementing stratified spark-ignited combustion by setting G/F, which is a ratio of a total weight G of gas containing burned gas within the combustion chamber to a weight F of fuel supplied inside the combustion chamber, to 30 or higher and igniting the mixture within the combustion chamber from the time at which the temperature of the engine coolant detected by the engine coolant temperature detection device exceeds a predetermined temperature.

In the case of implementing the stratified spark-ignited combustion by setting the excess air ratio EAR of the mixture within the combustion chamber to 2 or higher or setting the G/F to 30 or higher and igniting the mixture within the combustion chamber, it is necessary to favorably propagate the flame across the entire mixture within the combustion chamber. In order to realize the above, the engine needs to be warmed up sufficiently and the wall temperature of the combustion chamber needs to be sufficiently high. Meanwhile, as described above, according to the present invention, the engine is promptly warmed up.

Accordingly, the present invention is especially effective when implementing stratified spark-ignited combustion by setting an excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher, and igniting the mixture within the combustion chamber after the engine is warmed up. Specifically, according to the foregoing method, favorable stratified spark-ignited combustion can be realized promptly. The realization of this stratified spark-ignited combustion enhances the fuel consumption performance.

In the present invention, preferably, the engine further includes engine coolant temperature detection device for detecting a temperature of the engine coolant, and the control method further includes a ninth step of implementing homogeneous charge compression ignition combustion by setting an excess air ratio EAR of the mixture within the combustion chamber to 2 or higher from the time at which the temperature of the engine coolant detected by the engine coolant temperature detection device exceeds a predetermined temperature.

Moreover, in the present invention, preferably, the engine further includes engine coolant temperature detection device for detecting a temperature of the engine coolant, and the control method further includes a tenth step of implementing homogeneous charge compression ignition combustion by setting G/F, which is a ratio of a total weight G of gas containing burned gas within the combustion chamber to a weight F of fuel supplied inside the combustion chamber, to 30 or higher from the time at which the temperature of the engine coolant detected by the engine coolant temperature detection device exceeds a predetermined temperature.

In the case of implementing the homogeneous charge compression ignition combustion by setting the excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher, the temperature of the mixture within the combustion chamber needs to be sufficiently increased for enabling compressed self ignition in order to realize the homogeneous charge compression ignition combustion across the entire mixture within the combustion chamber. Meanwhile, as described above, according to the present invention, the engine is warmed up promptly and the wall temperature of the combustion chamber is increased sufficiently. Accordingly, the present invention is especially effective when implementing homogeneous charge compression ignition combustion by setting an excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher. Specifically, according to the foregoing method, favorable homogeneous charge compression ignition combustion can be realized promptly by maintaining the temperature of the mixture at a high temperature. The realization of this homogeneous charge compression ignition combustion reduces harmful substances; especially NOx, which are emitted from the engine.

Moreover, the present invention additionally provides a spark ignition engine comprising an engine body including a spark plug capable of igniting a mixture within a combustion chamber formed on a cylinder and a variable valve timing mechanism for causing an opening/closing timing of an exhaust valve to be variable, a control unit for controlling the engine body, a catalyst provided above an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio, and a catalyst temperature detection device for detecting or estimating a temperature of the catalyst, wherein the control unit implements a first step of igniting the mixture by the spark plug at an ignition timing that is on a more lag side than an MBT, which is an ignition timing in which an output torque of the engine becomes maximum, during a period from the time at which the start of the engine is completed and the engine starts autonomous rotation to the time at which the temperature of the catalyst detected or estimated by the catalyst temperature detection device becomes higher than a predetermined temperature, a second step of changing, based on the variable valve timing mechanism, the valve opening timing and/or valve closing timing of the exhaust valve so that a ratio of burned gas contained in the mixture within the combustion chamber becomes higher than the ratio of the burned gas during the implementation of the first step from the time at which the temperature of the catalyst detected or estimated by the catalyst temperature detection device becomes higher than a predetermined temperature, and a third step of igniting the mixture within the combustion chamber by the spark plug from the time at which the temperature of the catalyst detected or estimated by the catalyst temperature detection device becomes higher than a predetermined temperature.

With the present invention, the first step is executed during the first period from the time at which the start of the engine is completed and the engine starts autonomous rotation to the time at which the catalyst reaches a predetermined temperature (until the catalyst is activated). In the first step, the mixture is ignited at a timing that is on the more lag side than the MBT and which is closer to the exhaust stroke. Thus, the temperature of the exhaust gas that is emitted to the exhaust passage in the exhaust stroke can be increased. This increase in the temperature of the exhaust gas can promptly raise the catalyst to the activation temperature.

In addition, with the present invention, the second step and the third step are executed after the catalyst is activated. In the second step and the third step, the ratio of burned gas contained in the mixture is increased, and the mixture with a high ratio of burned gas is ignited and combusted. When a great amount of high temperature burned gas is compressed, the temperature inside the combustion chamber becomes a higher temperature. This temperature rise within the combustion chamber causes the engine to warm up more promptly (warm-up of the engine to be completed promptly).

When the second step is implemented and the ratio of burned gas contained in the mixture increases, the exhaust energy that flows into the catalyst decreases. Nevertheless, the conversion of the catalyst capable of purifying hydrocarbon, carbon monoxide and nitrogen oxide has hysteresis characteristics relative to the temperature of the influent exhaust gas. Thus, the catalyst that was raised to the activation temperature based on the implementation of the first step maintains its active state even when the second step is implemented. This realizes the prompt warm-up of the engine while maintaining the active state of the catalyst.

In the present invention, preferably, during the third step, the control unit ignites the mixture by the spark plug at an ignition timing that is set on a more advance side than the ignition timing in the first step.

With this device, the timing of igniting the mixture is advanced in the third step that is implemented after the catalyst becomes an activated state. This advancement of the ignition timing reduces the energy that is emitted to the exhaust passage and causes the temperature inside the combustion chamber to be a higher temperature. This realizes the warm-up of the engine even more promptly.

Moreover, in the present invention, preferably, the engine includes a throttle valve for adjusting the amount of air-intake that is inspired into the combustion chamber, and an injector for injecting fuel into the combustion chamber, and the control unit implements a fourth step of causing the injector to inject fuel in an injection amount in which the air-fuel ratio of the mixture within the combustion chambers in the vicinity of the theoretical air-fuel ratio relative to the air-intake amount adjusted by the throttle at least during the period from the time at which the start of the engine is completed and the engine starts autonomous rotation to the time at which the temperature of the catalyst detected or estimated by the catalyst temperature detection device becomes higher than a predetermined temperature.

Combustion of the mixture in the vicinity of the theoretical air-fuel ratio increases the gas temperature after the combustion within the combustion chamber. Thus, with this method, the gas temperature after the combustion within the combustion chamber will at least become higher during the period until the catalyst temperature reaches the activation temperature. This rise in gas temperature promotes the activation of the catalyst.

Moreover, preferably, the control unit continues the fourth step even after the time at which the temperature of the catalyst detected or estimated by the catalyst temperature detection device becomes higher than a predetermined temperature.

According to the foregoing configuration, the catalyst more reliably purifies the hydrocarbon, carbon monoxide and nitrogen oxide contained in the exhaust gas after the catalyst is activated.

Moreover, in the present invention, preferably, the engine further includes engine coolant temperature detection device for detecting a temperature of the engine coolant, and the control unit implements the second step from the time at which the temperature of the catalyst detected or estimated by the catalyst temperature detection device becomes higher than a predetermined temperature to the time at which the temperature of the engine coolant detected by the engine coolant temperature detection device exceeds a predetermined temperature, and, in the second step, closes the exhaust valve based on the variable valve timing mechanism at a valve closing timing that is set on a more advance side than an exhaust top dead center and set on a more advance side than the valve closing timing of the exhaust valve during the implementation of the first step.

According to the foregoing configuration, in the second step, the amount of burned gas (so-called internal EGR gas) remaining within the combustion chamber without being emitted from the combustion chamber to the exhaust passage will increase, and the ratio of burned gas contained in the mixture within the combustion chamber will consequently increase. Thus, in comparison to the case where the ratio of burned gas is increased based on the method (so-called external EGR) where the burned gas emitted from the exhaust passage is caused to once flow backward to the intake passage side and then introduced into the combustion chamber once again from the intake passage, the temperature of burned gas is maintained at a high temperature. This more reliably increases the temperature of the mixture within the combustion chamber.

In the foregoing configuration, preferably, the control unit implements a fifth step of closing, based on the variable valve timing mechanism, the exhaust valve at a valve closing timing that is set on a more advance side than the valve closing timing of the first step from the time at which the temperature of the engine coolant detected by the engine coolant temperature detection device becomes higher a predetermined temperature.

According to the foregoing configuration, variation in the valve closing timing of the exhaust valve is reduced in cases where the temperature of the engine coolant is lower and higher than a predetermined temperature; specifically, before and after the warm-up of the engine. This more reliably realizes the change of the valve closing timing of the exhaust valve to a more appropriate timing after the engine is warmed up.

Moreover, in the present invention, preferably, the engine further includes engine coolant temperature detection device for detecting a temperature of the engine coolant, and the control unit implements the second step from the time at which the temperature of the catalyst detected or estimated by the catalyst temperature detection device becomes higher than a predetermined temperature to the time at which the temperature of the engine coolant detected by the engine coolant temperature detection device exceeds a predetermined temperature, and, in the second step, opens the exhaust valve based on the variable valve timing mechanism during an intake stroke in addition to during an exhaust stroke, and causes a time-area of a valve lift of the exhaust valve during the intake stroke to be greater than the time-area in the first step.

With the foregoing configuration, in the second step, high temperature burned gas that was emitted to the exhaust passage during the exhaust stroke once again flows backward into the combustion chamber 14, and the ratio of burned gas contained in the mixture within the combustion chamber consequently increases. Thus, in comparison to the case where the ratio of burned gas is increased based on the method (so-called external EGR) where the burned gas emitted from the exhaust passage is caused to once flow backward to the intake passage side and then introduced into the combustion chamber once again from the intake passage, the temperature of burned gas is maintained at a high temperature. This more reliably increases the temperature of the mixture within the combustion chamber.

In the foregoing configuration, preferably, during the implementation of the second step, the control unit implements a sixth step of opening, based on the variable valve timing mechanism, the exhaust valve during an intake stroke in addition to during an exhaust stroke from the time at which the temperature of the engine coolant detected by the engine coolant temperature detection device exceeds a predetermined temperature, and causing a time-area of a valve lift of the exhaust valve during the intake stroke to be greater than the time-area in the first step.

According to the foregoing configuration, difference in the valve lift of the exhaust valve and the valve lift of the exhaust valve after the engine is warmed up is reduced in cases where the temperature of the engine coolant is lower and higher than a predetermined temperature; specifically, before and after the warm-up of the engine. This more reliably realizes the change of the exhaust valve to a more appropriate valve lift after the engine is warmed up.

In the present invention, preferably, the engine further includes engine coolant temperature detection device for detecting a temperature of the engine coolant, and the control unit implements a seventh step of implementing stratified spark-ignited combustion by causing the injector to inject fuel in an injection amount in which an excess air ratio EAR of the mixture within the combustion chamber becomes 2 or higher relative to the air-intake amount adjusted by the throttle and igniting the mixture by the spark plug from the time at which the temperature of the engine coolant detected by the engine coolant temperature detection device exceeds a predetermined temperature.

Moreover, in the present invention, preferably, the engine further includes engine coolant temperature detection device for detecting a temperature of the engine coolant, and the control unit implements an eighth step of implementing stratified spark-ignited combustion by causing the injector to inject fuel in an injection amount in which G/F, which is a ratio of a total weight G of gas containing burned gas within the combustion chamber to a weight F of fuel supplied inside the combustion chamber, becomes 30 or higher relative to the air-intake amount adjusted by the throttle and igniting the mixture by the spark plug from the time at which the temperature of the engine coolant detected by the engine coolant temperature detection device exceeds a predetermined temperature.

In the case of implementing the stratified spark-ignited combustion by setting the excess air ratio EAR of the mixture within the combustion chamber to 2 or higher or setting the G/F to 30 or higher and igniting the mixture within the combustion chamber, it is necessary to favorably propagate the flame across the entire mixture within the combustion chamber. In order to realize the above, the engine needs to be warmed up sufficiently and the wall temperature of the combustion chamber needs to be sufficiently high. Meanwhile, as described above, according to the present invention, the engine is promptly warmed up. Accordingly, the present invention is especially effective when implementing stratified spark-ignited combustion by setting an excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher, and igniting the mixture within the combustion chamber after the engine is warmed up. Specifically, according to the foregoing method, favorable stratified spark-ignited combustion can be realized promptly. The realization of this stratified spark-ignited combustion enhances the fuel consumption performance.

Moreover, in the present invention, preferably, the engine further includes engine coolant temperature detection device for detecting a temperature of the engine coolant, and the control unit implements a ninth step of implementing homogeneous charge compression ignition combustion by causing the injector to inject fuel in an injection amount in which an excess air ratio EAR of the mixture within the combustion chamber becomes 2 or higher relative to the air-intake amount adjusted by the throttle from the time at which the temperature of the engine coolant detected by the engine coolant temperature detection device exceeds a predetermined temperature.

Moreover, in the present invention, preferably, the engine further includes engine coolant temperature detection device for detecting a temperature of the engine coolant, and the control unit implements a tenth step of implementing homogeneous charge compression ignition combustion by causing the injector to inject fuel in an injection amount in which G/F, which is a ratio of a total weight G of gas containing burned gas within the combustion chamber to a weight F of fuel supplied inside the combustion chamber, becomes 30 or higher relative to the air-intake amount adjusted by the throttle from the time at which the temperature of the engine coolant detected by the engine coolant temperature detection device exceeds a predetermined temperature.

In the case of implementing the homogeneous charge compression ignition combustion by setting the excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher, the temperature of the mixture within the combustion chamber needs to be sufficiently increased for enabling compressed self ignition in order to realize the homogeneous charge compression ignition combustion across the entire mixture within the combustion chamber. Meanwhile, as described above, according to the present invention, the engine is warmed up promptly and the wall temperature of the combustion chamber is increased sufficiently. Accordingly, the present invention is especially effective when implementing homogeneous charge compression ignition combustion by setting an excess air ratio EAR of the mixture within the combustion chamber to 2 or higher, or by setting G/F, which is a ratio of a total weight G of gas containing burned gas within the combustion chamber to a weight F of fuel supplied inside the combustion chamber, to 30 or higher. Specifically, according to the foregoing method, favorable homogeneous charge compression ignition combustion can be realized promptly by maintaining the temperature of the mixture at a high temperature. The realization of this homogeneous charge compression ignition combustion reduces harmful substances; especially NOx, which are emitted from the engine.

The invention claimed is:

1. A method of controlling a spark ignition engine having a spark plug capable of igniting a mixture within a combustion chamber formed in a cylinder, a catalyst provided at an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio, a catalyst temperature detection device that detects or estimates a temperature of the catalyst, and an engine coolant temperature detection device that detects a temperature of the engine coolant, with the spark ignition engine being configured to be capable of igniting the mixture in the combustion chamber and changing valve characteristics of at least an exhaust valve of the engine, wherein the method comprises:
 executing a first control of igniting the mixture at an ignition timing that is set to be on a more lag side than an MBT, which is an ignition timing in which an output torque of the engine becomes maximum, and opening the exhaust valve from a closed position during an intake stroke in addition to during an exhaust stroke, during a period from the time at which the start of the engine is completed and the engine starts autonomous rotation to the time at which a temperature of the catalyst detected or estimated by the catalyst temperature detection device becomes higher than a first predetermined temperature; and
 executing a second control of igniting the mixture at an ignition timing that is set on a more advance side than the ignition timing in the first control, and opening the exhaust valve during the intake stroke in addition to during the exhaust stroke, during a period from the time at which the temperature of the catalyst detected or estimated by the catalyst temperature detection device becomes higher than the first predetermined temperature to the time at which the temperature of the engine coolant detected by the engine coolant temperature detection device exceeds a second predetermined temperature, and wherein, in the second control, a time-area of a valve lift of the exhaust valve during the intake stroke becomes greater than the time-area in the first control.

2. The method of controlling a spark ignition engine according to claim 1, wherein the first control further includes setting the air-fuel ratio of the mixture within the combustion chamber to be in the vicinity of the theoretical air-fuel ratio.

3. The method of controlling a spark ignition engine according to claim 2, wherein the second control further includes setting the air-fuel ratio of the mixture within the combustion chamber to be in the vicinity of the theoretical air-fuel ratio.

4. The method of controlling a spark ignition engine according to claim 2, further comprising executing a normal control from the time at which the temperature of the engine coolant detected by the engine coolant temperature detection device exceeds the second predetermined temperature, wherein the normal control includes implementing stratified spark-ignited combustion by setting an excess air ratio EAR of the mixture within the combustion chamber to 2 or higher and igniting the mixture within the combustion chamber.

5. The method of controlling a spark ignition engine according to claim 2, further comprising executing a normal control from the time at which the temperature of the engine coolant detected by the engine coolant temperature detection device exceeds the second predetermined temperature, wherein the normal control includes implementing stratified spark-ignited combustion by setting G/F, which is a ratio of a total weight G of gas containing burned gas within the combustion chamber to a weight F of fuel supplied inside the combustion chamber, to 30 or higher and igniting the mixture within the combustion chamber.

6. The method of controlling a spark ignition engine according to claim 2, further comprising executing a normal control from the time at which the temperature of the engine coolant detected by the engine coolant temperature detection device exceeds the second predetermined temperature, wherein the normal control includes implementing homogeneous charge compression ignition combustion by setting an excess air ratio EAR of the mixture within the combustion chamber to 2 or higher.

7. The method of controlling a spark ignition engine according to claim 2, further comprising executing a normal control from the time at which the temperature of the engine coolant detected by the engine coolant temperature detection device exceeds the second predetermined temperature, wherein the normal control includes implementing homogeneous charge compression ignition combustion by setting G/F, which is a ratio of a total weight G of gas containing burned gas within the combustion chamber to a weight F of fuel supplied inside the combustion chamber, to 30 or higher.

8. The method of controlling the spark ignition engine according to claim 1, further comprising executing a normal control from the time at which the temperature of the engine coolant detected by the engine coolant temperature detection device exceeds the second predetermined temperature, wherein the normal control includes opening the exhaust valve during the intake stroke in addition to during the exhaust stroke and causing the time-area of the valve lift of the exhaust valve during the intake stroke to be greater than the time-area in the first control.

9. A spark ignition engine having:
an engine body including a spark plug capable of igniting a mixture within a combustion chamber formed in a cylinder and a variable valve mechanism for causing valve characteristics of an exhaust valve to be variable;
a control unit for controlling the engine body;
a catalyst provided at an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio;
catalyst temperature detection device that detects or estimates a temperature of the catalyst; and
an engine coolant temperature detection device that detects a temperature of the engine coolant, wherein
the control unit implements:
a first control of igniting the mixture by the spark plug at an ignition timing that is on a more lag side than an MBT, which is an ignition timing in which an output torque of the engine becomes maximum, and opening the exhaust valve from a closed position by the variable valve mechanism during an intake stroke in addition to during an exhaust stroke, during a period from the time at which the start of the engine is completed and the engine starts autonomous rotation to the time at which a temperature of the catalyst detected or estimated by the catalyst temperature detection device becomes higher than a first predetermined temperature; and
a second control of igniting the mixture by the spark plug at an ignition timing that is set on a more advance side than the ignition timing in the first control, and opening the exhaust valve by the variable valve mechanism during the intake stroke in addition to during the exhaust stroke, during a period from the time at which the temperature of the catalyst detected or estimated by the catalyst temperature detection device becomes higher than the first predetermined temperature to the time at which the temperature of the engine coolant detected by the engine coolant temperature detection device exceeds a second predetermined temperature,
and wherein, in the second control, a time-area of a valve lift of the exhaust valve during the intake stroke becomes greater than the time-area in the first control.

10. The spark ignition engine according to claim 9, wherein
the engine includes a throttle valve for adjusting an amount of air-intake that is inspired into the combustion chamber, and an injector for injecting fuel into the combustion chamber,
the first control further includes causing the injector to inject fuel in an injection amount in which the air-fuel ratio of the mixture within the combustion chamber is in the vicinity of the theoretical air-fuel ratio relative to the air-intake amount adjusted by the throttle valve.

11. The spark ignition engine according to claim 10, wherein the second control further includes causing the injector to inject fuel in an injection amount in which the air-fuel ratio of the mixture within the combustion chamber is in the vicinity of the theoretical air-fuel ratio relative to the air-intake amount adjusted by the throttle valve.

12. The spark ignition engine according to claim 10, wherein the control unit implements a normal control from the time at which the temperature of the engine coolant detected by the engine coolant temperature detection device exceeds the second predetermined temperature, wherein the normal control includes implementing stratified spark-ignited combustion by causing the injector to inject fuel in an injection amount in which an excess air ratio EAR of the mixture within the combustion chamber becomes 2 or higher relative to the air-intake amount adjusted by the throttle valve and igniting the mixture by the spark plug.

13. The spark ignition engine according to claim 10, wherein the control unit implements a normal control from the time at which the temperature of the engine coolant detected by the engine coolant temperature detection device exceeds the second predetermined temperature, wherein the normal control includes implementing stratified spark-ignited combustion by causing the injector to inject fuel in an injection amount in which G/F, which is a ratio of a total weight G of gas containing burned gas within the combustion chamber to a weight F of fuel supplied inside the combustion chamber, becomes 30 or higher relative to the air-intake amount adjusted by the throttle valve and igniting the mixture by the spark plug.

14. The spark ignition engine according to claim 9, wherein the control unit implements a normal control from the time at which the temperature of the engine coolant detected by the engine coolant temperature detection device exceeds the second predetermined temperature, wherein the normal control includes opening the exhaust valve by the variable valve mechanism and causing the time-area of the valve lift of the exhaust valve during the intake stroke to be greater than the time-area in the first control.

15. A method of controlling a spark ignition engine having a spark plug capable of igniting a mixture within a combustion chamber formed in a cylinder, a catalyst provided at an exhaust passage and capable of purifying hydrocarbon, carbon monoxide and nitrogen oxide contained in an exhaust gas in a state where an air-fuel ratio within the exhaust passage is in the vicinity of a theoretical air-fuel ratio, a catalyst temperature detection device that detects or estimates a temperature of the catalyst, and an engine coolant temperature detection device that detects a temperature of the engine coolant, with the spark ignition engine being configured to be capable of igniting the mixture in the combustion chamber and changing valve characteristics of at least an exhaust valve of the engine, wherein the method comprises:

executing a first control of igniting the mixture at an ignition timing that is set to be on a more lag side than an MBT, which is an ignition timing in which an output torque of the engine becomes maximum, and opening the exhaust valve during an intake stroke in addition to during an exhaust stroke, during a period from the time at which the start of the engine is completed and the engine starts autonomous rotation to the time at which a temperature of the catalyst detected or estimated by the catalyst temperature detection device becomes higher than a first predetermined temperature; and executing a second control of igniting the mixture at an ignition timing that is set on a more advance side than the ignition timing in the first control, and opening the exhaust valve during the intake stroke in addition to during the exhaust stroke, during a period from the time at which the temperature of the catalyst detected or estimated by the catalyst temperature detection device becomes higher than the first predetermined temperature to the time at which the temperature of the engine coolant detected by the engine coolant temperature detection device exceeds a second predetermined temperature, and wherein, in the second control, a time-area of a valve lift of the exhaust valve as measured from a beginning of the valve opening during the intake stroke to a valve closing becomes greater than the time-area in the first control.

* * * * *